US010293959B2

(12) United States Patent
Alfano et al.

(10) Patent No.: US 10,293,959 B2
(45) Date of Patent: May 21, 2019

(54) PROBABILITY AND FREQUENCY OF ORBITAL ENCOUNTERS

(71) Applicant: Analytical Graphics Inc., Exton, PA (US)

(72) Inventors: Salvatore Alfano, Monument, CO (US); Daniel Oltrogge, Colorado Springs, CO (US)

(73) Assignee: Analytical Graphics Inc., Exton, PA (US)

( * ) Notice: Subject to any disclaimer, the term of this patent is extended or adjusted under 35 U.S.C. 154(b) by 602 days.

(21) Appl. No.: 15/204,426

(22) Filed: Jul. 7, 2016

(65) Prior Publication Data

US 2017/0096242 A1    Apr. 6, 2017

Related U.S. Application Data

(60) Provisional application No. 62/197,796, filed on Jul. 28, 2015.

(51) Int. Cl.
*B64G 3/00*    (2006.01)
*B64G 1/10*    (2006.01)

(52) U.S. Cl.
CPC    *B64G 3/00* (2013.01); *B64G 1/10* (2013.01)

(58) Field of Classification Search
CPC .............. B64G 3/00; B64G 1/10; G06F 17/18
See application file for complete search history.

(56) References Cited

U.S. PATENT DOCUMENTS

| 9,798,015 | B2* | 10/2017 | Gogliettino | G01S 19/27 |
| 2007/0032984 | A1* | 2/2007 | Alfano | G08G 5/045 |
| | | | | 702/181 |
| 2013/0292517 | A1* | 11/2013 | Briskman | B64G 1/24 |
| | | | | 244/158.8 |
| 2014/0074768 | A1* | 3/2014 | Horwood | B64G 3/00 |
| | | | | 706/52 |
| 2014/0330544 | A1* | 11/2014 | Nikolaev | B64G 3/00 |
| | | | | 703/2 |
| 2015/0088475 | A1* | 3/2015 | McKennon-Kelly | B64G 3/00 |
| | | | | 703/6 |

(Continued)

OTHER PUBLICATIONS

Alfano, S., and Oltrogge, D. "Volumetric Encounter Analysis Enhancements", Paper No. AAS 15-537, AIAA/AAS Astrodynamics Specialist Conference, Vail, CO, pp. 1-36, (Aug. 10-13, 2015).

(Continued)

*Primary Examiner* — Brian M O'Hara
*Assistant Examiner* — Keith L Dixon
(74) *Attorney, Agent, or Firm* — The Marbury Law Group, PLLC

(57) ABSTRACT

Systems, methods, devices, and non-transitory media of the various embodiments provide for a volumetric approach to determining orbital encounters that may determine the number of encounters over a specified length of time. Such information may be used to determine how often during an orbit or period of time an object might trigger a conjunction warning for a neighboring satellite. The various embodiments may be used as a planning and characterization tool to estimate satellite encounter rates for a prospective orbit regime and may provide an efficient, in-line approach to assess the number of encounters occurring within a user-specified span of time.

20 Claims, 21 Drawing Sheets

(56) References Cited

U.S. PATENT DOCUMENTS

| | | | | |
|---|---|---|---|---|
| 2015/0091753 A1* | 4/2015 | Gogliettino | ............ | G01S 19/27 342/357.66 |
| 2015/0134295 A1* | 5/2015 | Kim | ........................ | G01S 19/00 702/152 |
| 2017/0067996 A1* | 3/2017 | Coyle | ..................... | G01S 17/66 |

OTHER PUBLICATIONS

Kato, A., Lazare, B., Oltrogge, D. and Stokes, H., "Standardization by ISO to Ensure the Sustainability of Space Activities", ESA 2013 Space Debris Conference, Darmstadt, Germany, 8 pages, (Apr. 25, 2013).

Kato, A., Lazare, B., Oltrogge, D. and Stokes, H., "Debris Mitigation Strategies, Standards and Best Practices With Sample Application to CubeSats", Space Operations and Support Technical Committee (SOSTC) Space Operations Workshop, San Antonio, TX, 27 pages, (May 3, 2013).

Oltrogge, D.L., "QB50 Proposed Deployment ConOps", 2014 Cal Poly CubeSat Workshop, 20 pages, (Apr. 25, 2014).

Sibert, D., Borgeson, D., Peterson, G., Jenkin, A. and Sorge, M., "Operational Impact of Improved Space Tracking on Collision Avoidance in the Future LEO Space Debris Environment", AMOS 2010 Poster, 10 pages, (Sep. 2010).

Jenkin, A. B., Sorge, M. E., Peterson, G. E., McVey, J. P., and Yoo, B. B., "100-Year Low Earth Orbit Debris Population Model", Paper No. AAS 11-410, AAS/AIAA Astrodynamics Specialist Conference, Girdwood, Alaska, pp. 139-157, (Jul. 31-Aug. 4, 2011).

Vallado, D.A., and McClain, W., "Fundamentals of Astrodynamics and Applications", Fourth Edition, Microcosm Press, Hawthorne, CA, p. 666-667, (2013).

Xue, D. and Li, J, "Collision criterion for two satellites on Keplerian orbits", Celest. Mech. Dyn. Astron. 108, pp. 233-244, (2010).

Hoots, F.R., Crawford, L.L., and Roehrich, R.L., "An analytical method to determine future close approaches between satellites" Celest. Mech. Dyn. Astron. 33, pp. 143-158, (1984).

Vallado, D.A., and McClain, W., "Fundamentals of Astrodynamics and Applications", Fourth Edition, Microcosm Press, Hawthorne, CA, p. 648, (2013).

Oltrogge, D.L., "Efficient Solutions of Kepler's Equation via Hybrid and Digital Approaches", Paper No. AAS 14-228, 24th AAS/AIAA Space Flight Mechanics Meeting, Santa Fe, New Mexico, 24 pages, (Jan. 26-30, 2014).

Kozai, Y., "The Motion of a Close Earth Satellite", Astron. J., vol. 64, pp. 367-377, (Nov. 1959).

Dagum, P., Karp, R., Luby, M., and Ross, S, "An Optimal Algorithm for Monte Carlo Estimation", SIAM Journal on Computing, vol. 29, Issue 5, pp. 1484-1496, (Mar. 2000).

\* cited by examiner

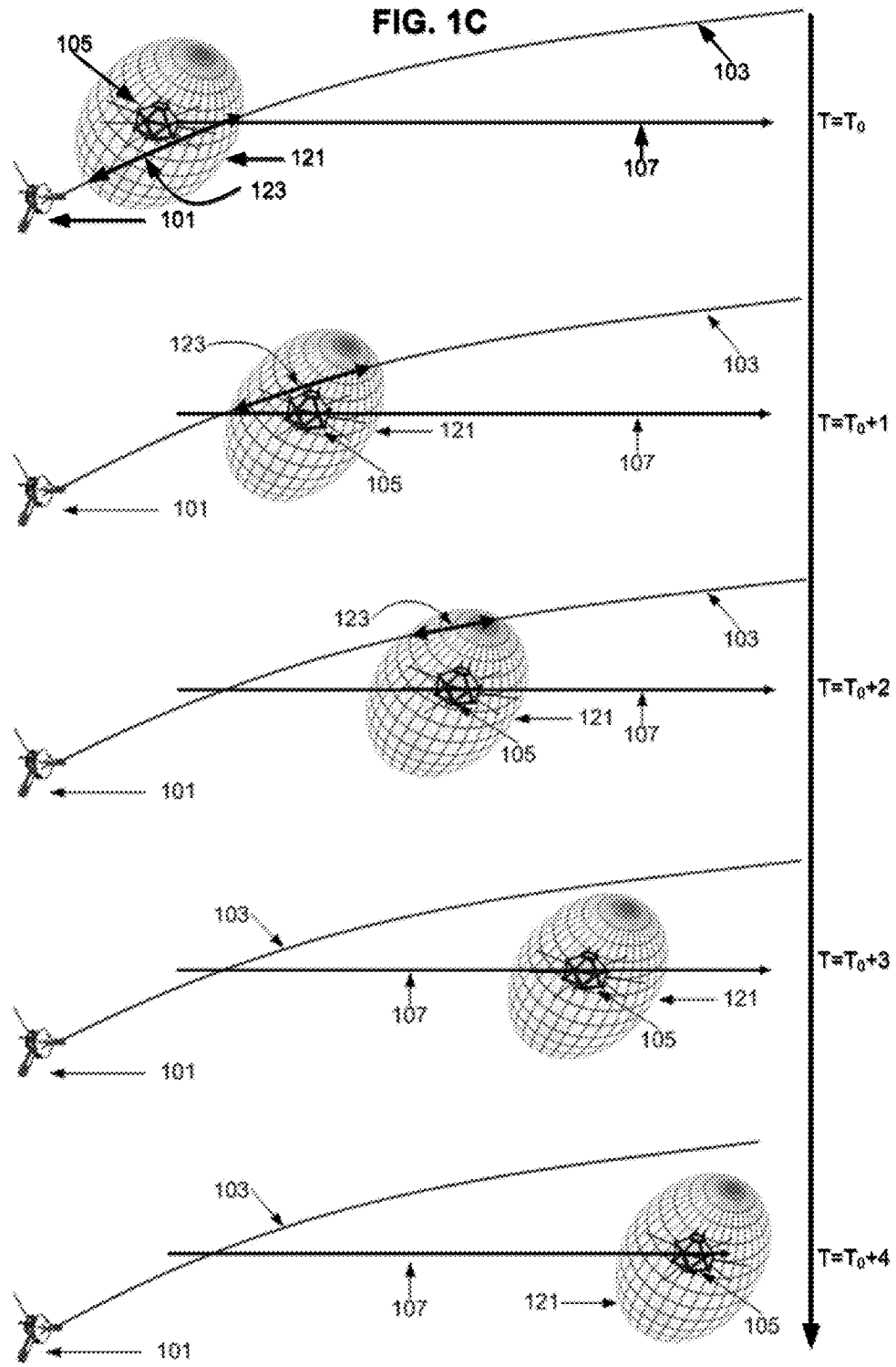

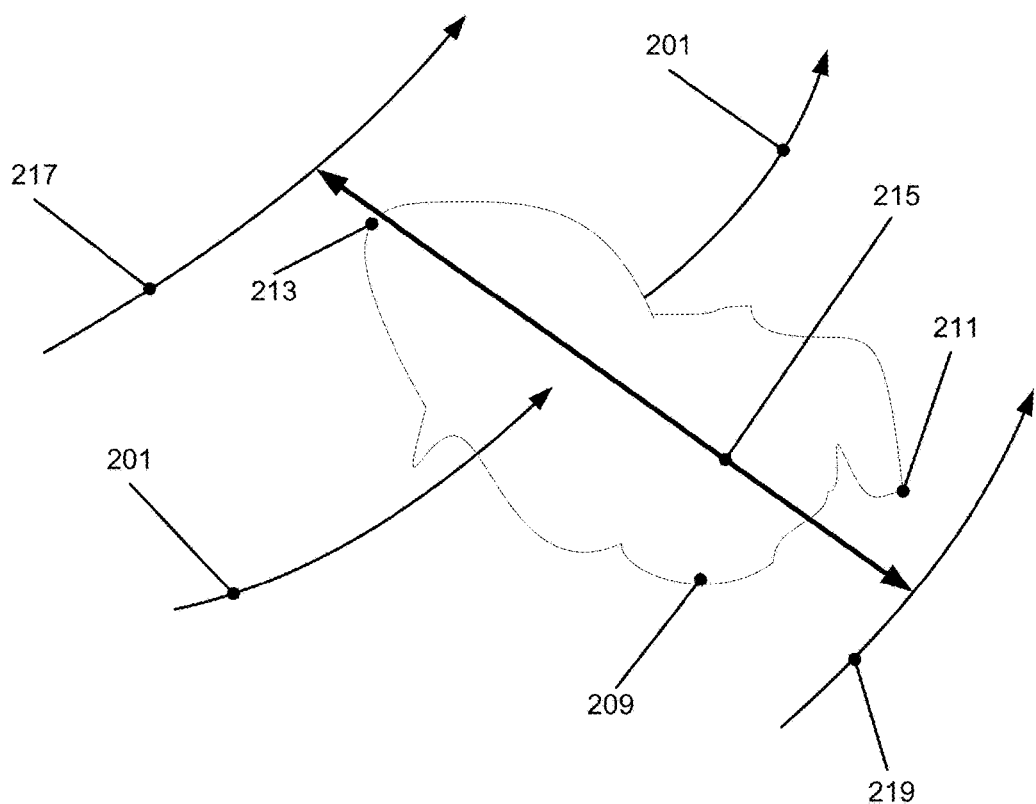

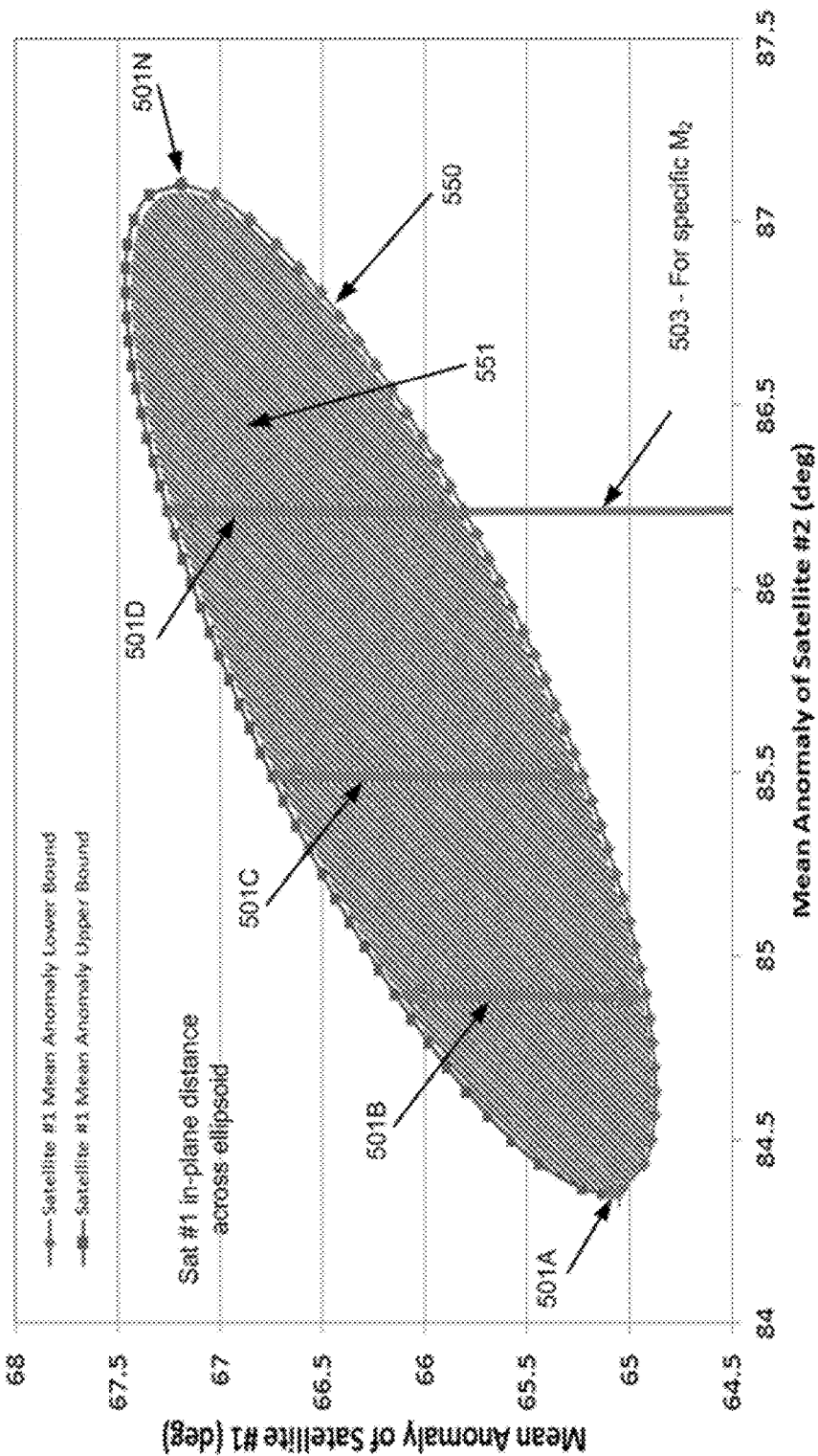

Finding N₈ in M Space

Finding N₈ in M Space, no, or infinite occurances

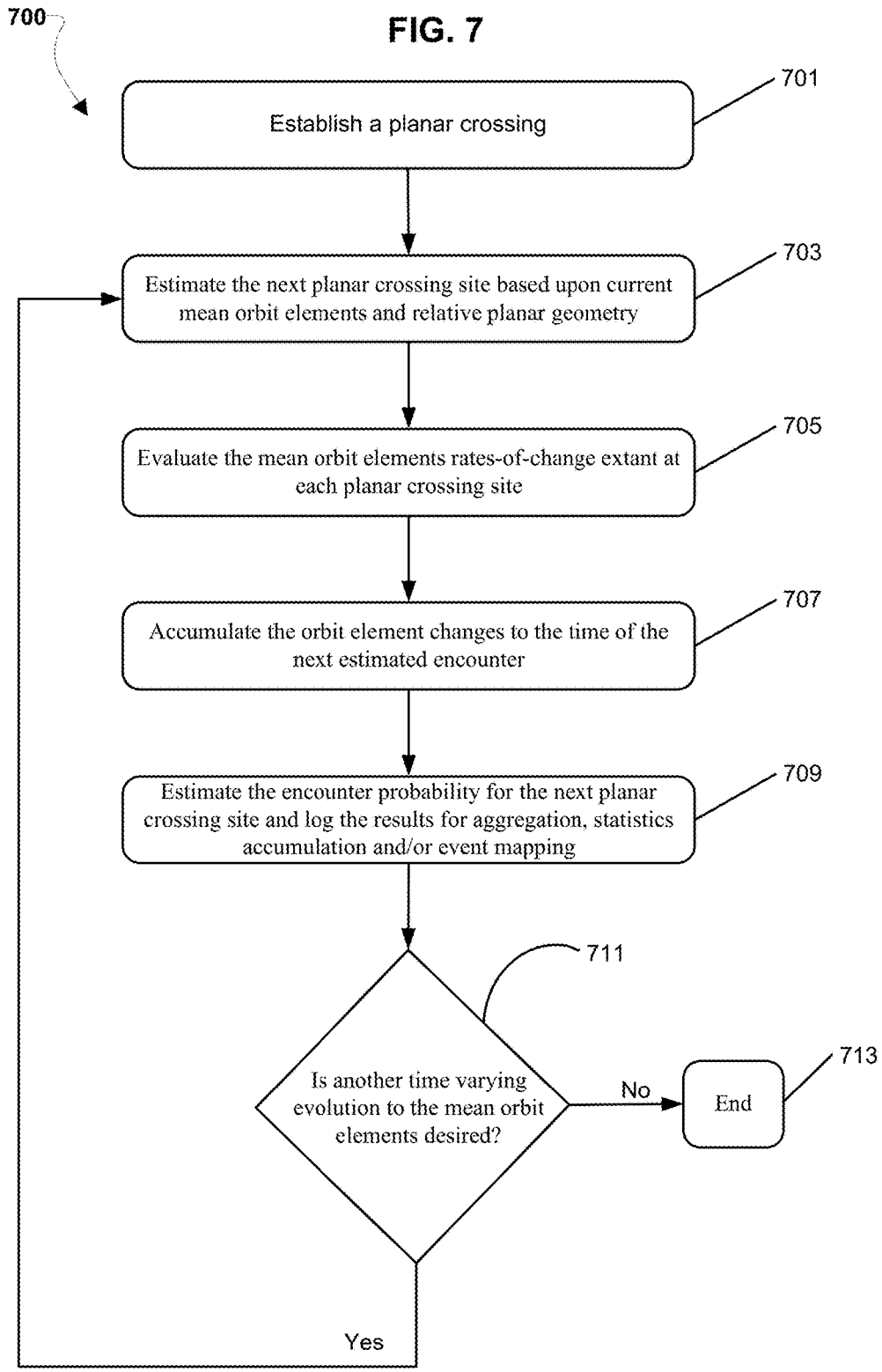

March 2005 LEO spatial density

March 2008 LEO spatial density

March 2010 LEO spatial density

March 2014 LEO spatial density

Encounter probability with coplanar orbits

Encounter probability without planar orbits

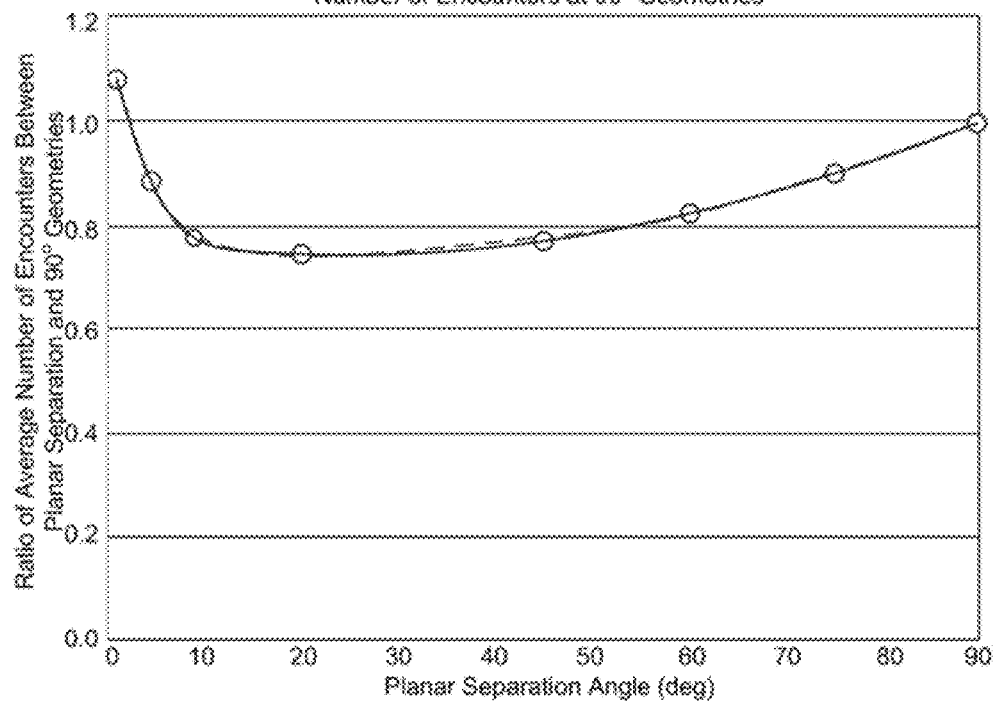

PROBABILITY AND FREQUENCY OF ORBITAL ENCOUNTERS

CROSS REFERENCE TO RELATED APPLICATIONS

This application claims the benefit of priority to U.S. Provisional Application No. 62/197,796 filed Jul. 28, 2015 entitled "Volumetric Assessment of Encounter Probability," the entire contents of which are hereby incorporated by reference.

BACKGROUND

Interest in varied applications of artificial satellites has steadily increased in recent decades. For example, satellites currently play a substantial role in navigation (e.g., Global Positioning System), commerce, communications, scientific research, and national security. In light of the increasing reliance on satellite-based technologies, the ability to locate and monitor the changing position of satellites continues to be an utmost priority to ensure that satellite-based technologies and services operate as intended.

SUMMARY

The systems, methods, devices, and non-transitory media of the various embodiments provide for a volumetric approach to determining orbital encounters that may determine the number of encounters over a specified length of time. The embodiments disclosed may be used as planning and characterization tools to estimate satellite encounter rates for prospective orbit regimes. Such information may be used to determine how often during an orbit or period of time an object might trigger a conjunction warning for a neighboring satellite. The various embodiments may provide an efficient, in-line approach to assess the number of encounters occurring within a user-specified span of time.

An embodiment method for determining an encounter probability may include, receiving initial orbital elements of a first satellite, the orbital elements including orbit semi-major axis, eccentricity, inclination, ascending node, argument of perigee, and a mean anomaly, calculating a first satellite's orbit according to the initial orbital elements of the first satellite, receiving orbital elements for a second satellite, calculating a second satellite's orbit according to the orbital elements of the second satellite, receiving characteristics of a volumetric shape that encloses the second satellite, rotating the volumetric shape along the second satellite's orbit to create a toroid, determining how many times a second satellite's orbit penetrates the toroid, where each penetration comprising a nodal crossing, determining the length of each nodal crossing; and calculating an instantaneous encounter probability value based on the total length of the nodal crossings for a single revolution about the orbit of the second satellite.

An embodiment method for determining the number of encounters in a given time period may include receiving initial orbital elements of a first satellite, orbital elements comprising orbit semi-major axis, eccentricity, inclination, ascending node, argument of perigee, and a mean anomaly, calculating a first satellite's orbit according to the initial orbital elements of the first satellite, receiving orbital elements for a second satellite, calculating the second satellite's orbit according to the orbital elements of the second satellite, receiving characteristics of a volumetric shape that encloses the second satellite, rotating the volumetric shape along the second satellite's orbit to create a toroid, determining how many times the second satellite's orbit penetrates the toroid, wherein each penetration comprising a nodal crossing, calculating an encounter region in mean anomaly space for each nodal crossing, where an encounter is each time the first satellite's orbit crosses through the encounter region, and incrementing the orbit of the satellite in mean anomaly space for a period of time to determine the number of encounters in a time period.

In various embodiments the volumetric shape may be any irregular enclosed volume. In various embodiments the volumetric shape may be a geometric volume. In various embodiments, the volumetric shape may be an ellipsoid. In various embodiments, the volumetric shape may be a sphere.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 1C is a time lapsed component block diagram of a satellite with a volumetric shape travelling along its orbital path as the volumetric cross another satellites orbital path.

FIGS. 2A-C illustrate various embodiments of applying an Apogee-Perigee filter.

FIG. 5A illustrates an encounter region in mean anomaly space.

FIG. 7 is a process flow diagram illustrating a method for accounting for time-varying evolutions of mean orbit elements by applying the encounter probability according to an embodiment

FIG. 10 is a graph of the ratio of average annual number of encounters at planar separation to number of encounters at 90° geometries.

DETAILED DESCRIPTION

Figure 1A:
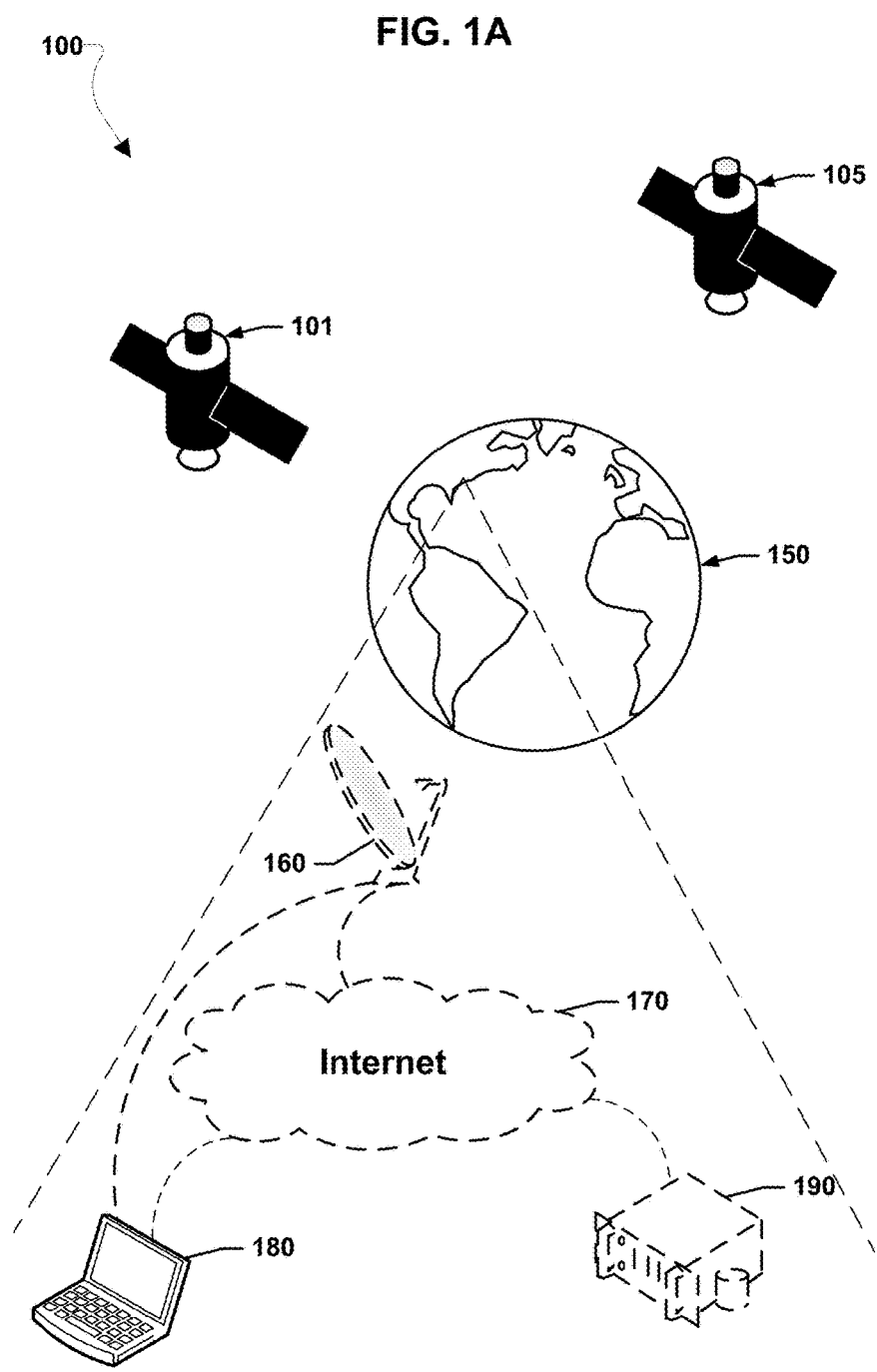
FIG. 1A is a component block diagram of a satellite tracking system suitable for use in the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In current satellite tracking systems, estimates of collision probability for a satellite are based on relative orbit geometries between the satellite and another object, the satellite's and object's sizes, and errors in the positional knowledge of the satellite and object as a function of time. However, long-term collision risk determinations cannot be based on errors in the positional knowledge of the satellite and object or in-track positions of the satellite and object, since those inputs cannot be anticipated ahead of time. Thus, since errors in the positional knowledge of the satellite and object or in-track positions of the satellite and object cannot be anticipated ahead of time, current satellite tracking systems cannot provide long term collision risk determinations, such as multi-year encounter screenings.

Currently, volumetric methods for estimating long-term encounter probability use a Monte Carlo sampling method. The Monte Carlo random sampling approach, while numerically valid, rapidly becomes untenable for small encounter volumes due to the number of samples required to meet Dagum bound criteria. Therefore, these methods may be overly burdensome for most computers for planning and characterization for long term estimates of satellite encounter rates for prospective orbit regimes.

Various embodiments presented herein may address these shortcomings by providing a method of calculating (1) the probability that two satellites will simultaneously occupy the same encounter volume, $P_{Encounter}$, and (2) the probability that when one satellite flies through a relative nodal crossing for a pair of satellites, $P_{Enc\_Node}$, the second satellite will simultaneously occupy that space. In this manner, the various embodiments may allow for tracking and adjusting satellite orbits to avoid collisions. The various embodiment methods described herein may enable the analysis to be performed for such risk assessments even for very small encounter volumes very rapidly. For an encounter volume of ten centimeters, the methods disclosed herein, assess encounter probability for a single orbit orientation of one satellite against all 15,000 objects in the public catalog in approximately 15 seconds. Runtime statistics show the embodiment methods to be highly efficient, with a typical five orders-of-magnitude runtime performance improvement of over the Monte Carlo assessment method.

The relationships between encounter probabilities, average annual number of encounters, orbit pair planar separation angle, encounter radius and propagation sample size/timespan are leveraged in the various embodiments. Scaling equations of the encounter probability and average annual number of encounters for a large encounter radius to the encounter probability and average number of encounters occurring within a prescribed amount of time (per year, day, etc.) for a (typically much smaller) desired encounter radius are provided. The various embodiment methods work for numerous orbit types to include all closed orbit types such as Low Earth Orbit (LEO), Highly Elliptical Orbit (HEO), Geosynchronous Earth Orbit (GEO), and GEO Transfer Orbit (GTO).

The following terms used in predictive conjunction monitoring are used herein to mean:

"Volumetric Shape": an enclosing shape about an object. A volumetric shape can be any shape that can contain an object, such as a satellite. Where a volumetric shape is equal to zero, the volumetric shape conforms to the shape of the object it is to enclose. A volumetric shape can refer to multiple separate volumetric shapes that may be ground together to entail a "single volumetric shape." The linking of multiple volumetric shapes may produce multiple toroids, or may produce a number of toroids equal to or less than the number of volumetric shapes that are linked depending on relative three dimensional orientation, orbital characteristics, and individual details of each volumetric shape in the grouping. A toroid may be defined as a surface generated by an arbitrary two dimensional shape rotating about, but not intersecting or containing, an axis in its own plane. References herein to a toroid and to volumetric shapes may include the volume enclosed by a toroidal surface. In embodiments where multiple volumetric shapes are linked or grouped together, a volumetric shape that encompasses all of the smaller, individual shapes may be used to allow for analysis if there will be an encounter probability and then further analysis to determine which of the individual volumetric shape may have an encounter if the enclosing volumetric shape has an encounter. Volumetric shapes generally have a spherical or ellipsoid volume used, however, the embodiments include other volumes such as tetrahedrons, cubes, non-regular enclosed volumes. The three dimensional volumetric shape can include shapes that may have "holes" in them, such as a torus, or doughnut shape. In an embodiment, a volumetric shape may contain a constellation of more than one satellite. This may allow for use of a single volumetric shape to be used for orbital planning, enabling encounter analysis without requiring calculations for each satellite by itself. Passing through an encounter space may also include tangential crossings where an orbit, toroid, or volumetric space touches, but does not enter inside, a space.

"Encounter probability": The likelihood of simultaneous occupancy by two satellites of a volume fixed to the second satellite's orbital track. The in-track positions of either or both satellites may be assumed to be entirely unknown, uncorrelated or both.

"$P_{PRED}$": Probability that a predicted conjunction event, coupled with approach geometry and estimated positional uncertainty that may actually result in a hardbody collision.

"Encounter radial distance": Screening threshold commonly employed in predictive ($P_{PRED}$) conjunction monitoring. Encounter radial distance is different from a hardbody radius in that an encounter radial distance is a distance from the object in orbit to the surface of a volumetric shape that is encloses the object. The encounter radial distance can be defined from a point, to include the physical center of an object, the center of rotation of an object, or from the surface of the object or from a point or location not within the object itself.

"$P_{MAX}$": Maximum possible probability that a predicted conjunction event, coupled with approach geometry, could result in a collision, irrespective of knowledge of positional uncertainty.

"$P_{Actual}$" or "$P_{Encounter}$": Estimated instantaneous probability of actual collision or encounter as represented by random in-track positioning along orbit paths or spatial density derived from occupied 3D volumetric shapes.

"$P_{OI}$": Probability of Operationally Impinging other operator(s) by a satellite's close approach event(s).

"$P_{AM}$": Probability of Avoidance Maneuver by other operator to avoid a satellite's close approach(es).

"$N_{Encounter}$": Number of encounter events per specified length of time.

"TCA": Time of Closest Approach between two objects.

"RAAN": Right Ascension of the Ascending Node.

"$M_n$": Mean anomaly of satellite n.

"P": Unit vectors of Eccentricity.

"Q": Semi-*latus* Rectum.

"W": Orbital Angular Momentum.

Keplerian orbit elements include the following 6 elements:
a: Semi-major axis size.
ecc: Orbital Eccentricity.
inc: Orbital Inclination.
Ω: Ascending Node.
ω: Argument of Perigee.
v: True anomaly.
$J_2$: zonal gravity coefficient
R: Attracting body equatorial radius
v: True Anomaly—Angular parameter defining the location of the orbiting body at a given time on a Keplerian orbit.

The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, the various embodiments are generally useful in any electronic device that includes a processor and executes application programs.

In the various embodiments, the number of encounter events and the associated probability may be used to determine how often a close approach may trigger an operations event, the operational risk of collision between a satellite and the currently-tracked orbital debris population, collision risk of intended post-mission disposal orbit, how frequently an operational satellite may come close to a currently tracked Resident Space Objects (RSOs) and the inherent, time averaged risk of collision with any RSO. These risks and expected operations may be used to calculate effective fuel or power needed to operate a satellite for a set period of time for collision avoidance and orbital adjustments.

Long-term encounter probability for two satellites with known orbit positions and uncertainties cannot be based on in-track positions because in-track positions of the two satellites generally cannot be reasonably predicted and may be assumed to be uncorrelated with each other. Rather, to determine long-term encounter probability for two satellites, the determination may be based on the time durations that the two satellites might spend in their orbits where an overlap within a prescribed encounter distance may occur.

To determine an encounter probability according to the various embodiments, statistical analysis use five orbital elements for each of a pair of satellites: semi-major axis, eccentricity, inclination, right ascension of the ascending node and argument of perigee. Along-track position may be assumed to be uniformly distributed in mean anomaly along its respective orbit. This method may also account for a host of perturbing forces to include, but not limited to oblate central body, drag, solar radiation pressure (SRP), and $3^{rd}$-body gravity influences.

FIG. 1A illustrates an embodiment satellite tracking system 100 including a first satellite 101 and a second satellite 105, in orbit around the Earth 150. While illustrated with only two satellites 105 and 106, the system 100 may track more than two satellites or other space based objects. The system may also include a communication network 170, such as the Internet, allowing a computing device 180 to communicate with a server 190 and tracking station 160. The computing device 180 may receive inputs from the server 190 and/or tracking station 160 to determine information associated with the orbits of the satellites 105 and 106.

In an embodiment, the method may begin by determining whether two orbits' apogee-perigee ranges have an overlap within the context of a user-specified engagement distance. If the two orbit's apogee-perigee ranges potentially overlap, then both orbits may be mapped into the first satellite's perifocal coordinate system to yield, at most four, relative planar crossing locations in inertial space for Keplerian orbits. More crossing locations may exist for non-Keplerian orbits.

If the two orbit's apogee-perigee ranges potentially overlap, a volumetric shape may be selected. A volumetric shape, such as a spherical, ellipsoid, cubic, or any other shape may then be moved along the second satellite's circular or elliptical orbit in increments of true anomaly that may produce distances that may be smaller than the encounter sphere's radius. This movement sweeps out a path-centered, ring shaped torus along the second satellite's orbit as illustrated in FIG. 1B.

Figure 1B:
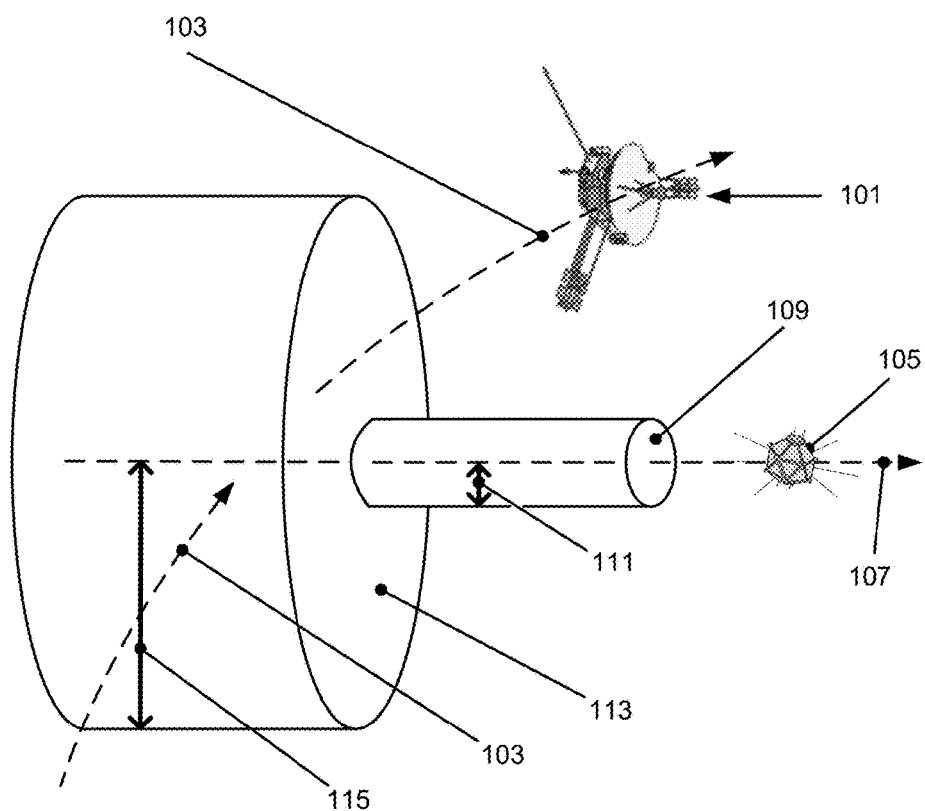
FIG. 1B is a component block diagram of a satellite tracking system and toroidal track about a satellite along its orbital path.

FIG. 1B illustrates a first satellite 101 who's orbital path 103 penetrates a second satellite's 105 path-centered torus 113 with a radius $R_{E_{BIG}}$ 115. The toroidal shape 113 may be created by a volumetric shape that may be swept around the orbital track 107 of the second satellite 105. Alternatively, if a smaller volumetric shape is used that results in a second satellite's path-centered torus 109 with a smaller radius $R_{E_{Small}}$ 111, then first satellite 101 will not penetrate the second satellite's 105 volumetric shape 109 and no encounter will occur as demonstrated by the embodiment in FIG. 1B. The non-encounter may also be eliminated from consideration using a perigee-apogee filter. In embodiments where volumetric shapes other than an ellipse or sphere are used, such as a cube, the shape may sweep out a toroidal shape with a different sized two dimensional cross section, depending on orientation of and shape of the volumetric shape.

A determination of probability of encounter may be made if/when the first satellite's orbit penetrates this torus, e.g., having a nodal crossing being greater than 0. FIG. 1C illustrates a time stepped advance of an ellipsoid volumetric shape 121 along the orbital path 107 of a second satellite 105. Conceptually, the torus may be breached when any portion of the volumetric shape 121 comes in contact with the first satellite's 101 orbital track 103. This is illustrated for times (T), $T=T_0$, $T=T_0+1$, and $T=T_0+2$ as the orbit of a second satellite 105 is incrementally moved along its orbital path 107. When the torus, not shown in FIG. 1C, created by ellipsoid volumetric shape 121 is breached, the orbit true anomalies extant at initial and final volumetric entry and exit points, each end of line 123, may be captured for both satellites and converted to their respective anomaly values. At $T=T_0+3$ and $T=T_0+4$, the orbital path 103 may no longer penetrate volumetric area 121. The likelihood that both satellites will simultaneously be inside that encounter region may then be determined.

Numerically, the volumetric shape may be moved along the second satellite's orbit in increments of true anomaly that produce distances much smaller than its radius. Should contact be made with the first satellite's track, the volumetric shape's incremental true anomaly may be converted to its incremental mean anomaly. By accumulating the products and summations of these incremental mean anomaly ranges until the volumetric shape completes one orbit, $P_{Encounter}$ may be determined. By reintroducing a sixth element (along-track position) this volumetric method may be used to count the number of expected encounters $N_{Encounter}$ in a period of time. The probability of an encounter, defined as above, may be assessed as the "Compound Probability of Independent Events" via the equation:

$$P_{Compound} = P_{Event\ 1} \cdot P_{Event\ 2} \cdot P_{Event\ 3} \cdots P_{Event\ i} \quad (1)$$

where $P_{Event\ i}$ represents the probability that the "$i^{th}$" independent event will occur.

For the $i^{th}$ incremental step of the approach described above, the probability of not having an encounter (e.g. surviving) may be expressed as $P_{Event\ i}$ according to the equation:

$$P_{Event\ i} = 1 - P_{Encounter_i} \quad (2)$$

For both Keplerian closed-path orbit ellipses and orbits whose elements vary in a secular fashion, the encounter probability $P_{Encounter}$ corresponding to equations (1) and (2) for the incremental mean anomaly step approach may be defined by the equation:

$$P_{Encounter} = 1 - \Pi[1 - P_{Sat1\ Present} \cdot P_{Sat2\ Present}] \quad (3)$$

Where $P_{Sat1\ Present}$ represents the probability that a first satellite will be present and $P_{Sat2\ Present}$ represents the probability that a second satellite will be present. By way of substitution in mean anomaly space, may yield the equation:

$$P_{Encounter} = 1 - \Pi\left[1 - \left(\frac{\Delta M_{1i}}{2\pi}\right) \cdot \left(\frac{\Delta M_{2i}}{2\pi}\right)\right] \quad (4)$$

Where $P_{Encounter}$ denotes the instantaneous probability of encounter corresponding to a specific relative nodal crossing (e.g., piercing of the second satellite's torus path by a first satellite), as aggregated over "i" steps in mean anomaly for satellites 1 and 2 through that encounter. For a closed-path orbit ellipse, there may be no more than two such "piercing" incursions per orbit.

In addition to determining the instantaneous probability $P_{Encounter}$, it may be desired to estimate the probability of encounter between two satellites per unit time (e.g. per day). The $P_{Encounter}$ formulation may be used to calculate a time history of relative nodal crossings (i.e. multiple samplings) and conditional probabilities spanning multiple relative nodal crossings between two satellites with potentially different satellite orbital periods. Encounter probability over a span of time that accounts for a series of possible conjunction events at both ascending and descending relative nodal crossings with disparate orbital periods for each satellite may be calculated as:

$$P_{Encounter_{PerDay_{Total}}} = \quad (5)$$
$$1 - (1 - P_{Encounter\_Per\_Day_{Asc}})(1 - P_{Encounter\_Per\_Day_{Desc}})$$

Algorithmically, calculating a probability of encounter can use an implementation of expressions for determining a first satellite's traversal mean anomaly $\Delta M_{1_i}$ and a second satellite's mean anomaly range $\Delta M_{2_i}$ for these small "i" incremental steps. Note that all of the above encounter probability metrics use the same building blocks $\Delta M_{1_i}$ and $\Delta M_{2_i}$.

The probability of encounter $P_{Encounter}$ for a single satellite pairing may be determined by accumulating the products and summations of these incremental mean anomaly ranges until the ellipsoid completes one orbit. When investigating a single orbit against a catalog (multiple satellite pairings) these can be combined to determine the overall aggregate probability of encounter $P_{Encounter\ Aggregate}$. By reintroducing the sixth element (along-track position) this volumetric method may be used to estimate the average number of expected aggregate encounters $N_{Encounter\ Aggregate}$ over a period of time. This may be considered a trending approach and may be valid for both coplanar and non-coplanar closed orbits to assess unintended encounters. However, the assumption of uniformly-distributed, relative in-track positions may not be applicable for all satellite pairings. Two satellites exhibiting synodic behavior every few weeks or less could violate this assumption. Examples of such periodic resonance would be a co-planar leader-follower formation, a well-controlled satellite constellation such as Iridium or Astra, or geostationary satellites in their assigned slots. In such cases, it is assumed that such satellites may be actively controlled in the same set and will not accidentally conjunct with each other. Even for such cases, this method may be used to determine average aggregate encounters of such a satellite or satellite grouping with other objects not in the synodic set, such as debris. For those cases where satellites in periodic resonance must be analyzed against the synodic set, a conjunction analysis tool may be used that propagates the orbits to find occurrences of close approach and computes near-term instantaneous collision probability.

For a given encounter space evaluation/event, a running accumulation of $$\Pi\left\{1 - \left[\frac{\Delta M_{1i}}{2\pi}\right] \cdot \left[\frac{\Delta M_{2i}}{2\pi}\right]\right\} \text{ and } \left\{1 - \left[\frac{\Delta M_{2i}}{2\pi}\right]\right\}$$

may be kept for all non-zero incremental encounters until the sphere completes one orbit, thus facilitating the computation of the probability of random encounter for this satellite pairing at any instant of time as well as during the nodal crossing events.

To calculate a collision probability, a perifocal coordinate system may be used. For a Keplerian orbit with elements a, ecc, inc, $\Omega$, and $\omega$, the unit vectors of eccentricity (P), semi-latus rectum (Q), and orbital angular momentum (W) may be defined as:

$$P(\Omega, \omega, inc) = \begin{pmatrix} \cos(\Omega) \cdot \cos(\omega) - \sin(\Omega) \cdot \sin(\omega) \cdot \cos(inc) \\ \sin(\Omega) \cdot \cos(\omega) + \cos(\Omega) \cdot \sin(\omega) \cdot \cos(inc) \\ \sin(\omega) \cdot \sin(inc) \end{pmatrix} \quad (6)$$

$$Q(\Omega, \omega, inc) = \begin{pmatrix} -\cos(\Omega) \cdot \sin(\omega) - \sin(\Omega) \cdot \cos(\omega) \cdot \cos(inc) \\ -\sin(\Omega) \cdot \sin(\omega) + \cos(\Omega) \cdot \cos(\omega) \cdot \cos(inc) \\ \cos(\omega) \cdot \sin(inc) \end{pmatrix} \quad (7)$$

-continued $$W(\Omega, inc) = \begin{pmatrix} \sin(\Omega) \cdot \sin(inc) \\ -\cos(\Omega) \cdot \sin(inc) \\ \cos(inc) \end{pmatrix} \quad (8)$$

The transformation matrix T which maps from the PQW frame to the inertial frame may be:

$$T(\Omega, \omega, inc) = [P|Q|W] \quad (9)$$

The positional vector p may be expressed in terms of the true anomaly v as:

$$p(v) = \frac{a \cdot (1 - ecc^2)}{1 + ecc \cdot \cos(v)} \cdot (\cos(v) \cdot P + \sin(v) \cdot Q) \quad (10)$$

If the first satellite's orbit (elements designated with subscript 1) is not coplanar with the second satellite's orbit (subscript 2) then the vector of the line of mutual nodes J may be obtained from the angular momentum vectors of the two orbits:

$$J = W(\Omega_2, inc_2) \times W(\Omega_1, inc_1) \quad (11)$$

$$J = \begin{pmatrix} \cos(\Omega_1) \cdot \cos(inc_2) \cdot \sin(inc_1) - \cos(\Omega_2) \cdot \cos(inc_1) \cdot \sin(inc_2) \\ \sin(\Omega_1) \cdot \cos(inc_2) \cdot \sin(inc_1) - \sin(\Omega_2) \cdot \cos(inc_1) \cdot \sin(inc_2) \\ \sin(\Omega_1 - \Omega_2) \cdot \sin(inc_1) \cdot \sin(inc_2) \end{pmatrix} \quad (12)$$

It should be understood that the closest approach distance between two elliptical, non-coplanar paths are not necessarily along this line of mutual nodes.

Given Keplerian orbital elements for both satellites, equations. (8-11) express the components of the unit vectors of eccentricity (P), semi-latus rectum (Q), and orbital angular momentum (W) of the second satellite's orbit in the perifocal frame of the first satellite's orbit.

$$\begin{pmatrix} P_x & Q_x & W_x \\ P_y & Q_y & W_y \\ P_z & Q_z & W_z \end{pmatrix} = T(\Omega_1, \omega_1, inc_1)^T \cdot T(\Omega_2, \omega_2, inc_2) \quad (13)$$

For the true anomaly $v_2$ in this frame, the position vector of the sphere's center along the second satellite's orbit may be:

$$\begin{pmatrix} x \\ y \\ z \end{pmatrix} = \frac{a_2 \cdot [1 - (ecc_2)^2]}{1 + ecc_2 \cdot \cos(v_2)} \cdot \begin{pmatrix} P_x & Q_x \\ P_y & Q_y \\ P_z & Q_z \end{pmatrix} \cdot \begin{pmatrix} \cos(v_2) \\ \sin(v_2) \end{pmatrix} \quad (14)$$

Equation 15, below, is an example of an ellipsoid embodiment. (x y z) designates a single surface point on the volumetric shape and the three by three matrix indicates the shape, size, and orientation of the ellipsoid.

$$(x \ y \ z) \begin{pmatrix} c_{11} & c_{21} & c_{31} \\ c_{21} & c_{22} & c_{32} \\ c_{31} & c_{32} & c_{33} \end{pmatrix}^{-1} (x \ y \ z)^T = 1 \quad (15)$$

To find an initial $\Delta M_1$, linear motion through the volumetric shape, in this embodiment, an ellipsoid is assumed. A first satellite's position may be designated as $[x_0, y_0, z_0]$ and velocity $[vx_0, vy_0, vz_0]$ provides:

$$(x_0 + vx_0 \cdot t \ y_0 + vy_0 \cdot t \ z_0 + zx_0 \cdot t) \begin{pmatrix} c_{11} & c_{21} & c_{31} \\ c_{21} & c_{22} & c_{32} \\ c_{31} & c_{32} & c_{33} \end{pmatrix}^{-1} \quad (16)$$

$$(x_0 + vx_0 \cdot t \ y_0 + vy_0 \cdot t \ z_0 + zx_0 \cdot t)^T = 1$$

Solving the resulting quadratic equation from equation (16) for t, may result in t1 and t2. If t1 and t2 are real, then:

$$\Delta M_1 = \left[ \frac{|t_2 - t_1|}{n_1} \right]. \quad (17)$$

Figure 2A:
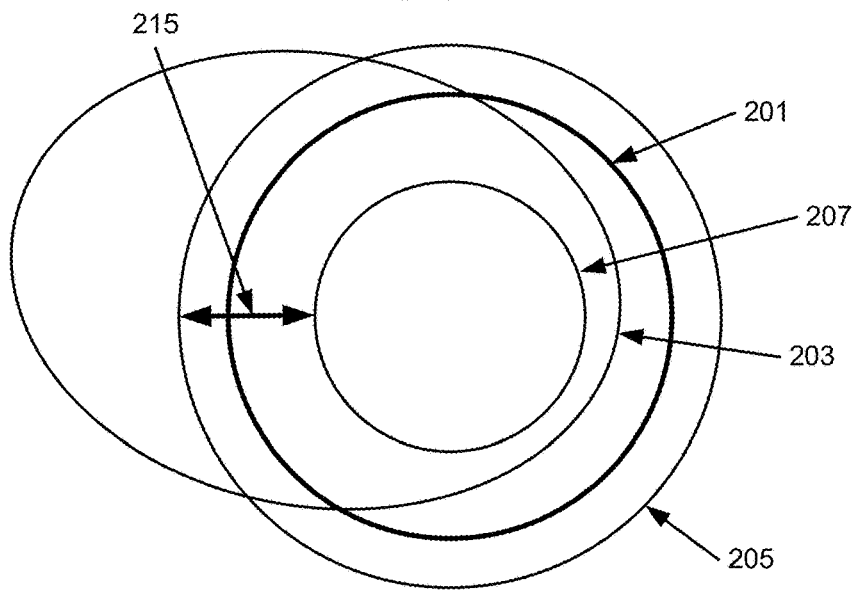

FIG. 2A illustrates an apogee-perigee filter that may be used to tremendously reduce computational loading for all-on-all space catalog assessments. This filter may be purely geometrical, using the known properties of size and shape for simplified two-body orbital motion. Both orbits may be treated as coplanar, even if the orbits are not. Satellite pairs that have overlapping tracks may be considered further. 201 is a satellite orbital path that is to be examined for possible encounters. 205 is an apogee-perigee filter candidate outer perimeter. Orbits that exist solely outside of 205 may immediately be ignored. 207 is an apogee-perigee filter candidate inner perimeter. Orbits that exist solely inside of 207 may also immediately be ignored. Orbits that cross into the area between an apogee-perigee filter candidate outer perimeter 205 and an apogee-perigee filter candidate inner perimeter 207, such as orbit 203, may be used for further calculation.

Figure 2B:
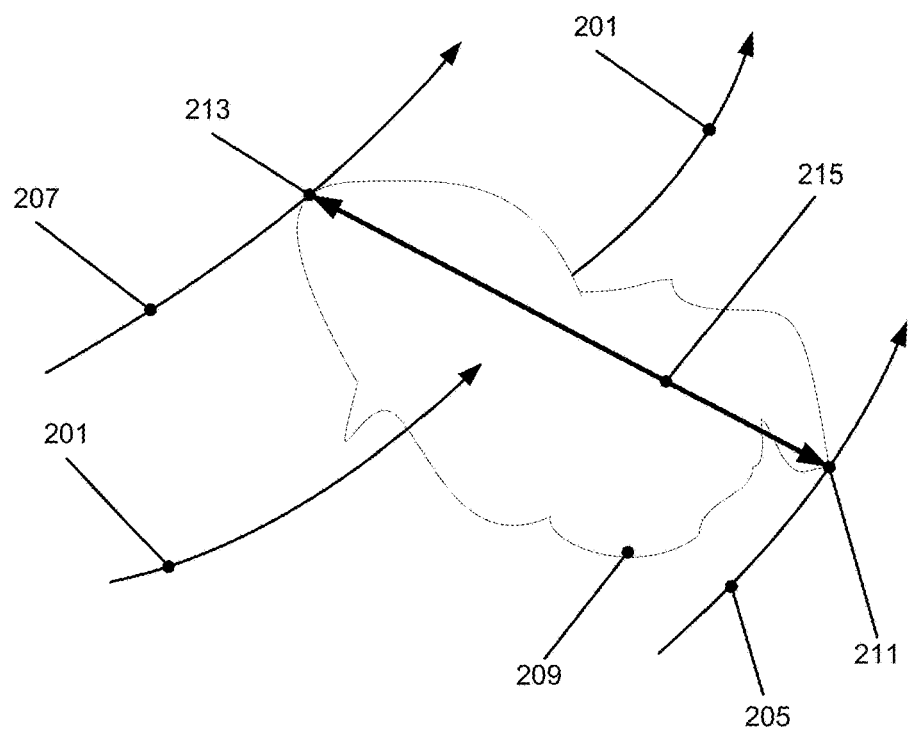

FIG. 2B illustrates an embodiment of an apogee-perigee filter. The distance between the filter candidate outer perimeter 205 and the filter candidate inner perimeter 207 at any given point can be measured by line 215. If a volumetric shape is used to create a toroidal shape, collapsing the three dimensional volumetric shape to a two dimensional projection 209 of the three dimensional volumetric shape in the orbital plane of orbit 201, the furthest outward reach element 211 may be used to create the filter candidate outer perimeter 205 while the furthest inner reaching element 213 may be used to create filter candidate inner perimeter 207.

Alternatively, the apogee-perigee filter can have filter candidate outer perimeter 219 with a radius greater than the furthest outward reach element 211 and/or filter candidate inner perimeter 217 with a radius less than the furthest inner reaching element 213 as illustrated in FIG. 2C. The filter candidate inner perimeter 207 and filter outer candidate perimeter 205 may be circular or may be any other two dimensional enclosed shape. The apogee-perigee filter can include ellipses that parallel the orbital path of a satellite with smaller and larger pathways, respectively, compared to the orbit.

This filter may be used to eliminate orbits that cannot possibly come within a specified range. If one satellite's perigee is above the other's apogee by a specified amount, the pair need not be examined further. Using this approach, many satellite pairs may be eliminated from further scrutiny, reducing processing time by setting the probability to zero without additional computation. This filter may be checked at the beginning of each time interval or when considering new perturbative changes in the Keplerian elements.

In a torus-based method, it is unnecessary to iteratively converge on an exact TCA because the method volumetrically accumulates all of the relevant "snippets" of encounter probability around the torus in a digitized manner. Using relative planar crossings points as points-of-reference about which to perform volumetric accumulation. The second satellite's torus may be breached when the first satellite's track comes in contact with it, or equivalently, the torus may be breached when a second satellite's volumetric shape of equal volumetric encounter radius to the torus comes in contact with the first satellite's track.

Equation (11) may be used to determine a planar-crossing-relative ascending node in the first satellite's PQW frame. Arbitrarily, the first satellite's P vector may be used as a pseudo-node if the orbits are coplanar. The volumetric shape may be moved along the second satellite's orbit in increments of true anomaly that produce distances much smaller than the encounter threshold radius. The encounter volumetric shape's movement may be examined in each of four quadrants, two relative to the planar-crossing-relative ascending node and two relative to the planar-crossing-relative descending node. Each quadrant's analysis may begin at the planar-crossing relative node and may end when the z component from equation (14) exceeds the volumetric shape's encounter radius or when 90° of true anomaly has been traversed. Thus, inclusiveness is assured for both co-planar and non-co-planar situations. The first assessment may begin at the planar-crossing-relative ascending node moving forward and the second assessment moving backwards. Likewise the third assessment may begin at the planar-crossing-relative descending node moving forward and the fourth assessment moving backwards.

A mean anomaly M changes with respect to true anomaly v as:

$$\frac{dM}{dv} = \frac{r^2}{a^2\sqrt{1-ecc^2}} \quad (18)$$

Where:

$$r_2 = \frac{a_2 * (1 - ecc_2^2)}{1 + ecc_2 \cos v_2} \quad (19)$$

Or equivalently:

$$\frac{dM}{dv} = \frac{(1-ecc^2)^{\frac{3}{2}}}{(1+ecc\cos v)^2} \quad (20)$$

This relationship is independent of orbit size, being a function of only true anomaly and eccentricity.

For each increment, should contact be made with the first satellite's track, then the volumetric shape's incremental true anomaly $\Delta v_2$ is converted to its incremental mean anomaly $\Delta M_2$ via:

$$\Delta M_2 = \frac{(1-ecc_2^2)^{\frac{3}{2}}}{(1+ecc_2 \cos v_2)^2} \Delta v_2 \quad (21)$$

Figure 3A:
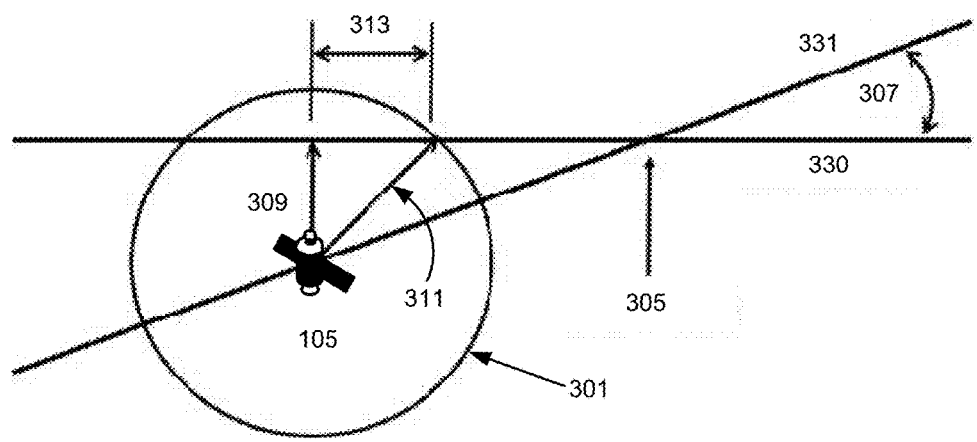
FIG. 3A illustrates an in-plane view of the sphere intersecting with a first satellite's orbit plane.

FIG. 3A illustrates an embodiment of an in-plane view of a sphere 301 intersecting with the first satellite's orbital plane 330. Where a first satellite's orbital plane 330 crosses a second satellite's orbital plane 331 in the two dimensional frame of reference, is relative node 305. The D is the sphere's radius 311, $z_{2\,is}$ its out-of-primary-plane component 309, and $\Delta i$ is the relative inclination between the two orbital planes 307. The plane slices the sphere to create an in-plane circle of radius s 313. D 311 and s 313 are equal for the co-planar case for a sphere.

$$s = \sqrt{D_2^2 - z_2^2} \quad (22)$$

Figure 3B:
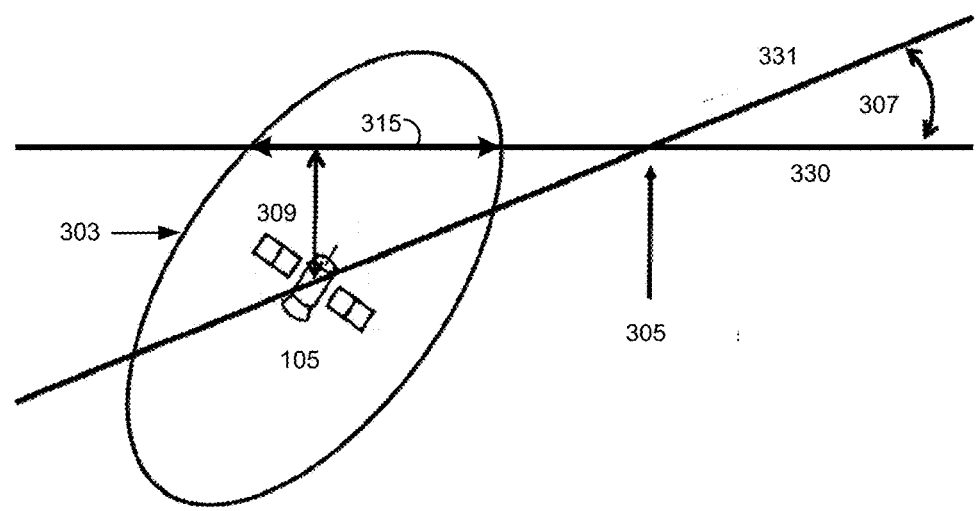
FIG. 3B illustrates an in-plane view of the ellipsoid intersecting with a first satellite's orbit plane.

FIG. 3B illustrates an embodiment of an in-plane view of an ellipsoid 303 intersecting with the first satellite's orbital plane 330. The length of the first satellite's 105 that traverses through the ellipsoid volume 303 may be length 315. For other enclosed volumes, the area created by the penetration of a first satellite's orbital plane through the geometric volume may be used as the area for calculations. For some shapes, this can create multiple areas as a satellite passes through a volume. For an encounter counter, this would be counted as a single encounter even if multiple penetrations of a single volume occur.

Figure 4A:
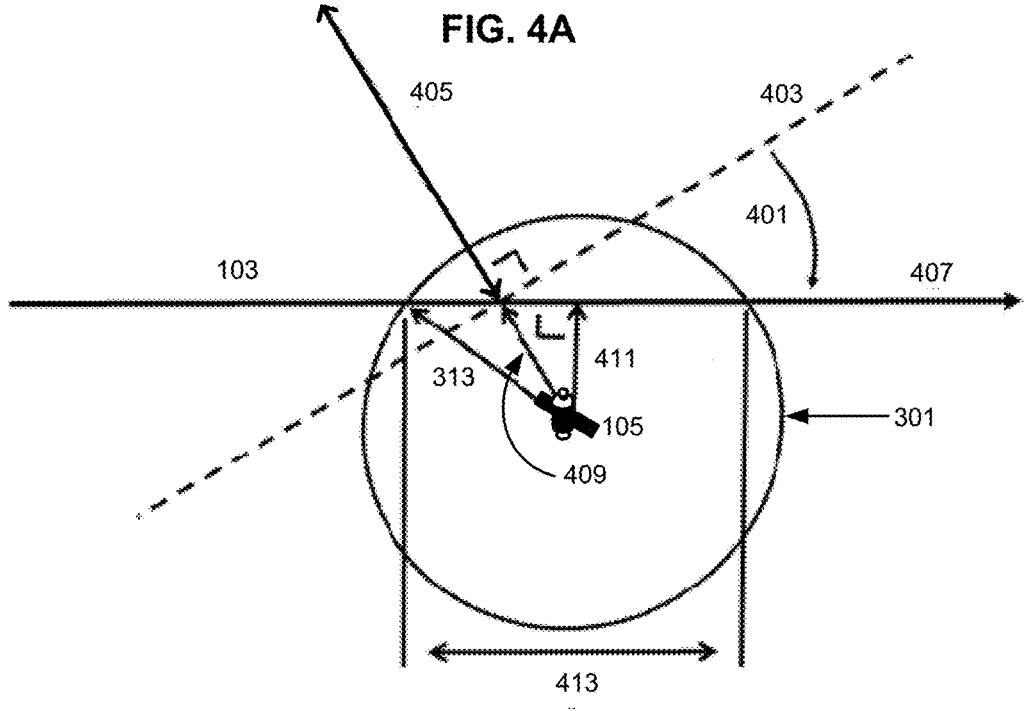
FIG. 4A illustrates an above-plane view of the sphere intersecting with a first satellite's orbit plane.
Figure 4B:
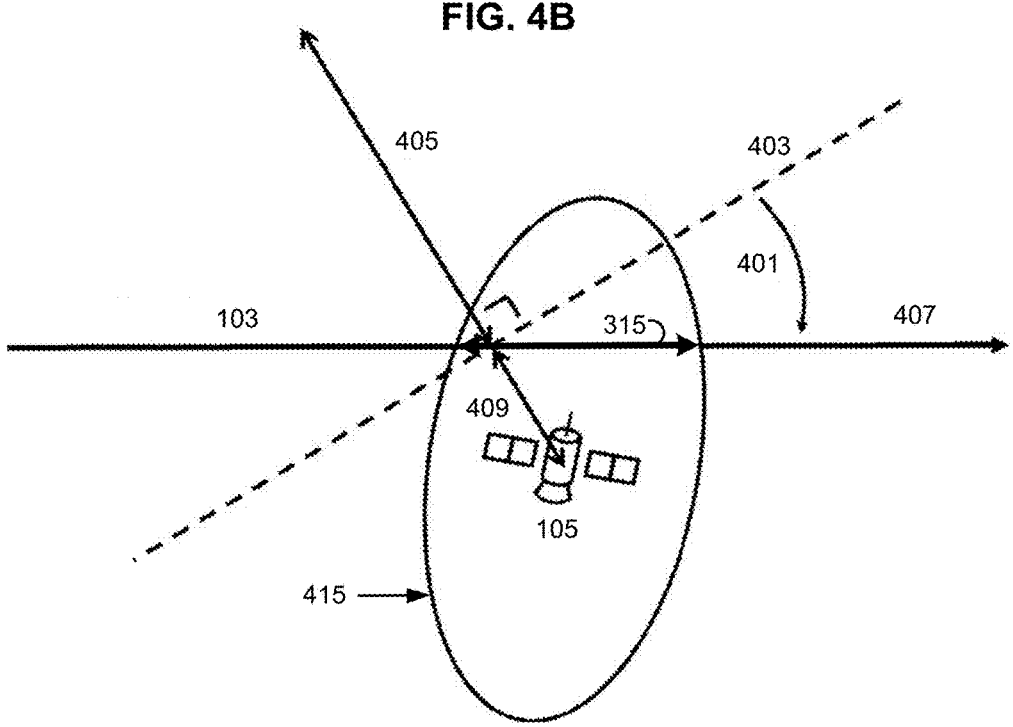
FIG. 4B illustrates an in-plane view of the ellipsoid intersecting with a first satellite's orbit plane.

FIG. 4A illustrates the same circumstance as is illustrated in FIG. 3A, but looking down on the first satellite's orbital plane at the resultant circle of radius s 313. FIG. 4B illustrates same circumstance as illustrated in FIG. 3B but looking down on the first satellite's orbital plane at the resultant ellipse using line 315.

Because the second satellite's orbit is represented in the first satellite's frame, the true anomaly $v_1$ of the sphere's centroid in FIG. 4A is determined from:

$$\cos(v_1) = \frac{x_2}{\sqrt{(x_2)^2 + (y_2)^2}} \quad (23)$$

k is the distance from the second satellite to the nearest point on the first satellites trajectory 411, where $k = d \cdot \cos(\phi)$. $r_1$ is the first satellite's radial distance 405, which may be perpendicular to the local horizon 403, becomes:

$$r_1 = \frac{a_1 \cdot [1 - ecc_1^2]}{1 + \frac{x_2 \cdot ecc_1}{\sqrt{(x_2)^2 + (y_2)^2}}} \quad (24)$$

$\phi$ the flight path angle 401 relative to the local horizon may be determined from equation:

$$\cos(\phi)^2 = \frac{a_1^2 \cdot [1 - ecc_1^2]}{r_1 \cdot (2a_1 - r_1)} \quad (25)$$

$v_1$ the velocity 407 of the first satellite may be determined by the equation:

$$v_1 = \sqrt{\mu\left(\frac{2}{r_1} - \frac{1}{a_1}\right)} \quad (26)$$

In the embodiment where a sphere is used, d the in-plane distance 409 from the circle's center to the first satellite's orbit track along $r_1$ 405, which is perpendicular to the local horizon 403, is:

$$d=|\sqrt{(x_2)^2+(y_2)^2}-r_1| \qquad (27)$$

Assuming the first satellite's path 103 is represented as a straight line across the in-plane circle, the traversal distance δ 413 is:

$$\delta=2\cdot\sqrt{s^2-(d\cdot\cos(\phi))^2} \qquad (281)$$

Equation (28) provides an inclusivity test. The circle contains part of the first satellite's track 103 only if δ 413 is real. This equation is valid for positive and negative values of φ 401 and near- or far-side crossings. A near-side crossing, as illustrated in FIG. 4A, occurs when $(r_1^2 < x_2^2+y_2^2)$. Knowing the traversal distance δ 403 and velocity $v_1$, the first satellite's traversal time through the circle may be determined and its incremental mean anomaly accordingly by equation:

$$\Delta M_1 = \sqrt{\frac{\mu}{a_1^3}} \cdot \frac{\delta}{v_1} \qquad (29)$$

Numerically, the sphere may be moved along the second satellite's orbit in increments of true anomaly $\Delta v_2$ that produce distances much smaller than its encounter volume radius. Should contact be made with the first satellite's track as determined by equation (25), then the sphere's incremental true anomaly may be converted to its incremental mean anomaly $\Delta M_2$ using equations (20) or (21). The corresponding incremental mean anomaly for a first satellite may be computed from equation (29), and then both $\Delta M_1$ and $\Delta M_2$ may be accumulated as desired to estimate $P_{Encounter}$ and/or $P_{Encounter\_Per\_Day_{Total}}$.

In FIG. 4B, the distance from the center of the ellipsoid to the crossing of the primary trajectory of a first satellite 103 and d the local horizon 403 may be measured by distance 409. δ the traversal distance 417 is the distance along the primary trajectory that satellite one is to pass through the ellipsoid.

Figure 14:
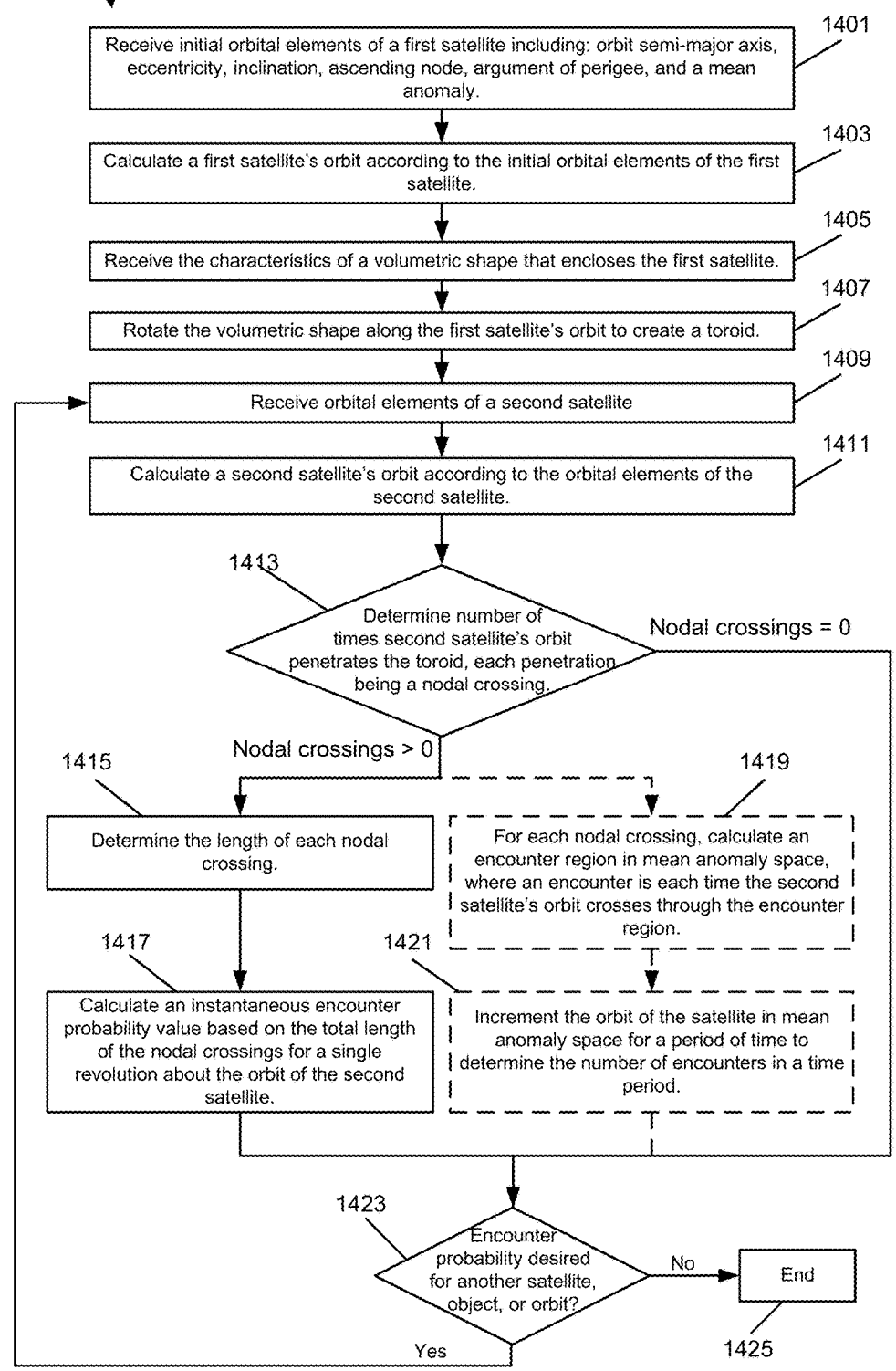
FIG. 14 is a process flow diagram illustrating an embodiment method for determining an encounter probability.

Table 1, below, contains data illustrating an example of a pair of orbital elements chosen to demonstrate the volumetric approach for an encounter threshold of 100 km. This may correspond to block 1401 as illustrated in FIG. 14.

TABLE 1

| Orbital Elements | First Satellite | Second Satellite |
|---|---|---|
| Semi-major axis: | 7178 km | 6959.7213554 km |
| Eccentricity: | 0.1 | 0.0016627 |
| Inclination: | 40° | 48.4302° |
| Ascending Node: | 0° | 52.0120° |
| Argument of Perigee: | 20° | 332.5785° |
| True Anomaly: | 0 | 0 |

In one embodiment, the calculations may begin by setting initial conditions to force a first encounter such that $M_{1\_low} < M_1 < M_{1\_high}$ matches to a desired precision the output of the embodiment to current short term methods that require integration of in-track satellite position for conjunction analysis. The method is sensitive to initial conditions, as illustrated in FIG. 5C.

It should be noted that a periodic coupling between the two orbits can significantly affect the results. If the initial conditions are such that no encounters occur over the coupling period, then no encounters will ever occur unless the Keplerian elements are perturbed, such as by J2 and higher, SRP, drag, low thrust ascent/descents, or updated Keplerian elements per orbit or time increment. FIG. 5C illustrates an embodiment where no encounters will occur with a satellite, illustrated by area 598 because of the periodicity and lack of perturbing forces. Likewise, if the conditions are such that multiple encounters occur within the period for another satellite, illustrated by area 599, then those encounters may be repeated ad infinitum unless the Keplerian elements are perturbed. This demonstrates that the method may be sensitive to initial conditions. This may be an example of synodic resonance between the two satellites. Even for such cases, the method may be used to accurately determine average aggregate encounter rates of such a satellite with other objects not in the synodic set, such as debris. A simple test to determine which satellite pairings exhibit sufficient resonance to be considered part of the set is applied.

Two satellites are considered to be in resonance if their mean motions (Ṁ), when multiplied by integers I and J, satisfy the equation:

$$|\dot{M}_1 J - \dot{M}_2 I| \leq \in \qquad (30)$$

I and J represent the number of complete revolutions of satellites #1 and #2 respectively. The parameter ∈ measures resonance "strength" with exact resonance occurring when ∈ equals zero.

The determination of synodic behavior is based on the size chosen for ∈. For example, the satellites may be considered to be in resonance if the integers show periodicity within one day, one week, or some other time span of concern. As an example consider an ellipsoidal volume and assume two satellites to be in near resonance if, after either completes one orbit, satellite #1 finds itself in the same $i^{th}$ ellipsoid of satellite #2. This means that the identical encounter will be repeated in the next orbit. Letting D be the average distance the ellipsoid travels from one iteration to the next in the time it takes for satellite #1 to complete its orbit(s), the resonance parameter becomes:

$$\in = \frac{D}{a_2 2\pi \sqrt{\frac{a_1^3}{\mu}}} \qquad (31)$$

If equation (31) is satisfied for I=1 or J=1, then satellite #1 is in near resonance with satellite #2 and should be included in the synodic set.

Current methods only allow for short term calculations, spanning days or at most a few weeks. However, various embodiment methods allow for long term calculations. This is because the various embodiment methods conduct the conjunction and probability calculations without integrating an in-tract satellite position.

FIG. 5A illustrates an encounter region in Mean Anomaly Space for the in-plane view of a first satellite that has orbital elements listed above in Table 1. For every incremental $M_2$ 503 where contact is possible there is a corresponding range of $M_1$ for a first satellite in which an encounter could occur. The shape of the graph may vary depending on the volumetric shape chosen for a first satellite, but it is the area, or areas, enclosed that provides $P_{Encounter}$. $M_1$ crossings at 501A, 501B, 501C, 501D to 501N with in a time period, as determined by the embodied method, passing through an encounter region which is depicted by the area inside the encounter region ellipse 550 illustrated in FIG. 5A. $M_1$ 501D corresponds to an $M_2$ 503. Only 5 lines 501 are shown, where using the method, numerous more crossings through volume 550 may exist. The encounter probability of the two satellites is this area 551 enclosed by ellipse 550, is divided by $4\pi$.

$$P_{Encounter} = \Sigma\left[\left(\frac{\Delta M_{1i}}{2\pi}\right) \cdot \left(\frac{\Delta M_{2i}}{2\pi}\right)\right] \quad (32)$$

Figure 5B:
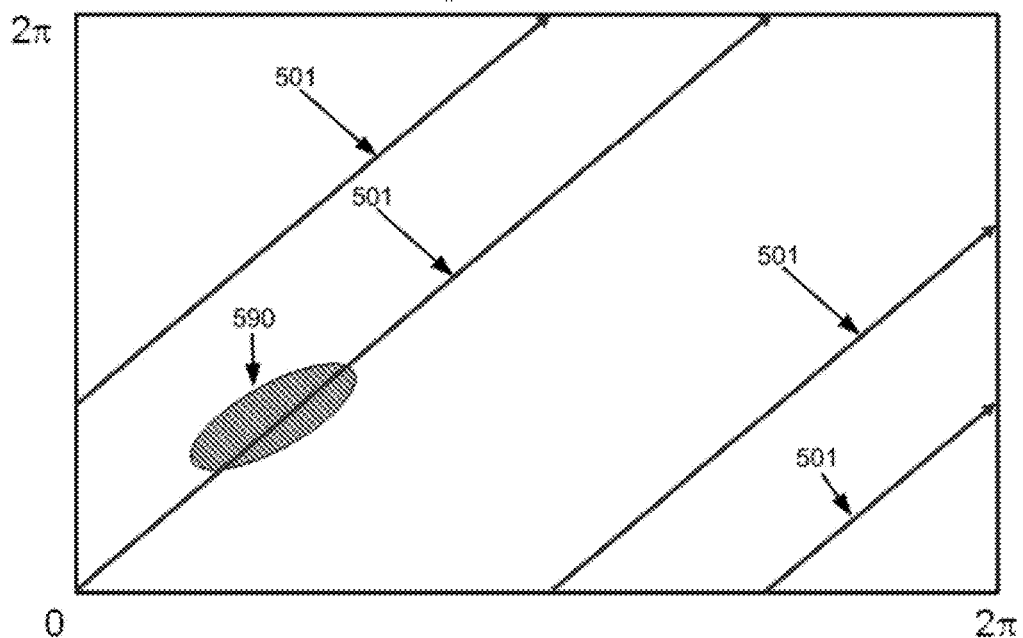
FIGS. 5B and 5C illustrate finding a number of encounters in M space.
Figure 5C:
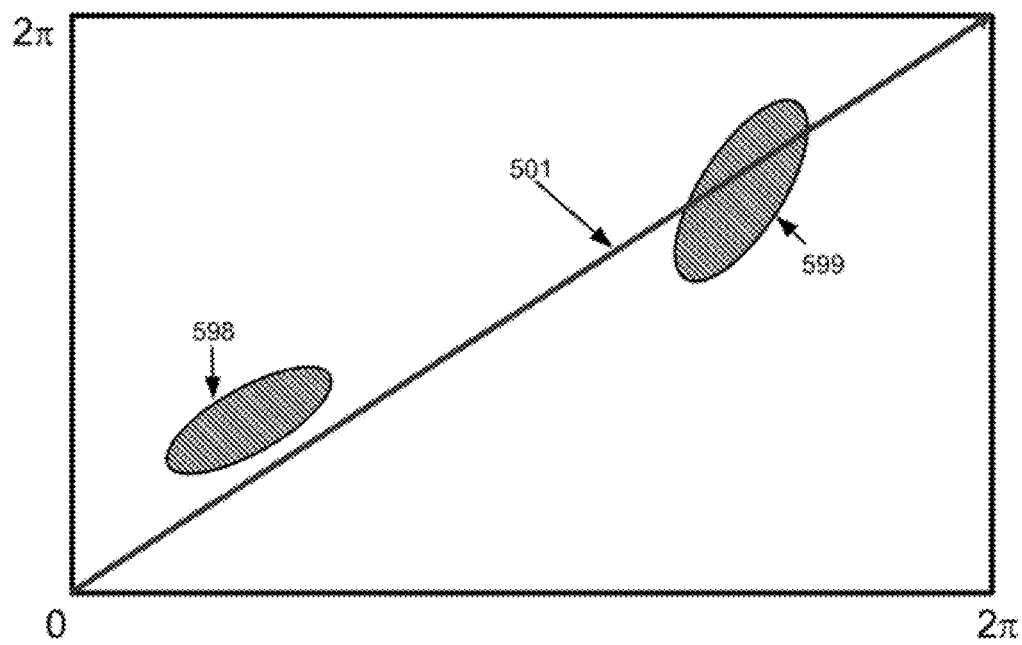

FIG. 5B is a graph of finding of $N_{Encounter}$, the number of encounters, in M space for a full range of an orbit from 0 to $2\pi$ for both satellites. FIG. 5B is similar to FIG. 5A, in that FIG. 5A is a zoomed in view from 84 to 87.5 degrees for a second satellite and 64.5 to 68 degrees for a first satellite where FIG. 5B is in terms of $\pi$. In one embodiment, ellipse 590 illustrates the area of an encounter region. The line 501 illustrates the orbital track of the first satellite overtime. Each time line 501 passes through area 590, the counter for encounters may be increased. Each satellite's orbit has a radial range from 0 to $2\pi$ as it completes an orbit. The orbital paths 501 appear as straight lines with the same slope because $$\frac{dM}{dt}$$

is a constant for Keplerian orbits in this embodiment. The lines may not be straight or parallel for other orbits or where $$\frac{dM}{dt}$$

does not yield a constant value. To determine the number of encounters for a set period of time, each time a satellite enters an encounter region, the number of contacts may be increased by one or more. The lines 501 would continue onward for a length equivalent to the length of orbits that is completed in a period of time. The embodiment illustrated in FIG. 5B the time period allows for two full orbits and a single encounter.

The various embodiments may be used to estimate the encounter probability between two orbits. These calculations may be enhanced to incorporate the short-periodic orbit element variations caused by a simple oblate earth ($J_2$) model. Equations for short-periodic terms for orbit elements including an expression for radial short-periodic variation.

However, since the $J_2$ model encounter probability method volumetrically aggregates probabilities as a function of true anomaly (in-track) positions, the along-track short-periodic variations are not relevant to a volumetric method and may be ignored. Conversely, radial and cross-track variations could impact the method, thereby altering the encounter probability estimates or even the ability of two orbit paths to conjunct at all.

Cross-plane variations are induced by variations about an orbit's mean inclination and, to a lesser extent, mean RAAN in the Earth equatorial frame.

Cross-plane-yielding variations may be computed from equations (33) and (34). All independent variables are mean orbit elements (i.e. prior to addition of the $\Delta$ perturbations in the conversion from mean to osculating elements).

$$\Delta i_Q = \quad (35)$$
$$\frac{3}{8}\frac{J_2 R^2}{Q^2}\sin 2inc\left[\cos 2(v+\omega) + ecc\cos(v+2\omega) + \frac{ecc}{3}\cos(3v+2\omega)\right]$$

$$\Delta\Omega_Q = -\frac{3}{2}\frac{J_2 R^2}{Q^2}\cos inc\left[v - M + ecc\sin v - \quad (36)\right.$$
$$\left.\frac{1}{2}\sin 2(v+\omega) - \frac{ecc}{2}\sin(v+2\omega) - \frac{ecc}{6}\sin(3v+2\omega)\right]$$

With slight reformulation to remove singularity for circular orbits and to correct for Kozai's missing factor of two in the numerator of the $$\frac{r}{a}$$

term, yields:

$$\Delta r_Q = \quad (35)2$$
$$\frac{J_2 R^2}{Q}\left[-\frac{1}{2}\left(1 - \frac{3}{2}\sin^2 inc\right)\left(1 + \frac{ecc\cos v}{1+\sqrt{1-ecc^2}} + \frac{2r}{a\sqrt{1-ecc^2}}\right) + \frac{1}{4}\sin^2 inc\cos(2v+2\omega)\right]$$

It may be seen from above that $\Delta i_Q$ amplitude will be maximized at 45° inclination and at very low altitudes. In one example illustrated in FIG. 6, a worst-case conditions using a 250 km circular orbit altitude inclined at 45° to illustrate a "worst-case" cross-track (from both inclination and RAAN) as well as radial short-periodic variations as a function of mean argument of latitude where (u=ƒ+ω).

Figure 6:
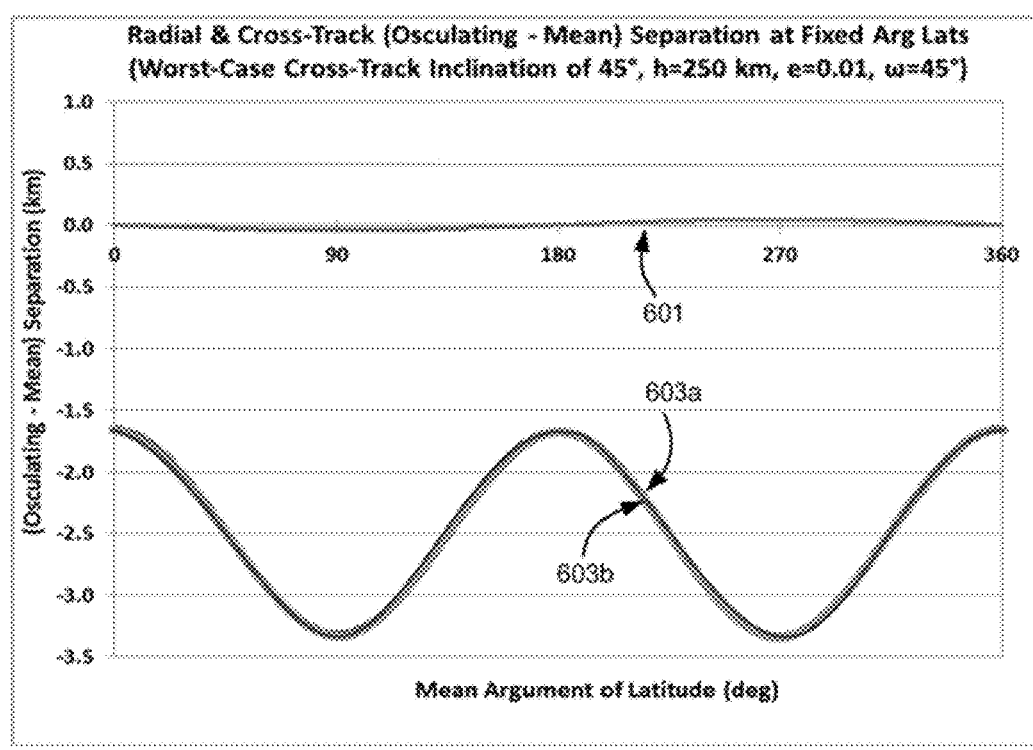
FIG. 6 illustrates a radial & cross track (osculating-mean) separation at fixed arranged latitudes for an embodiment.
Figure 8A:
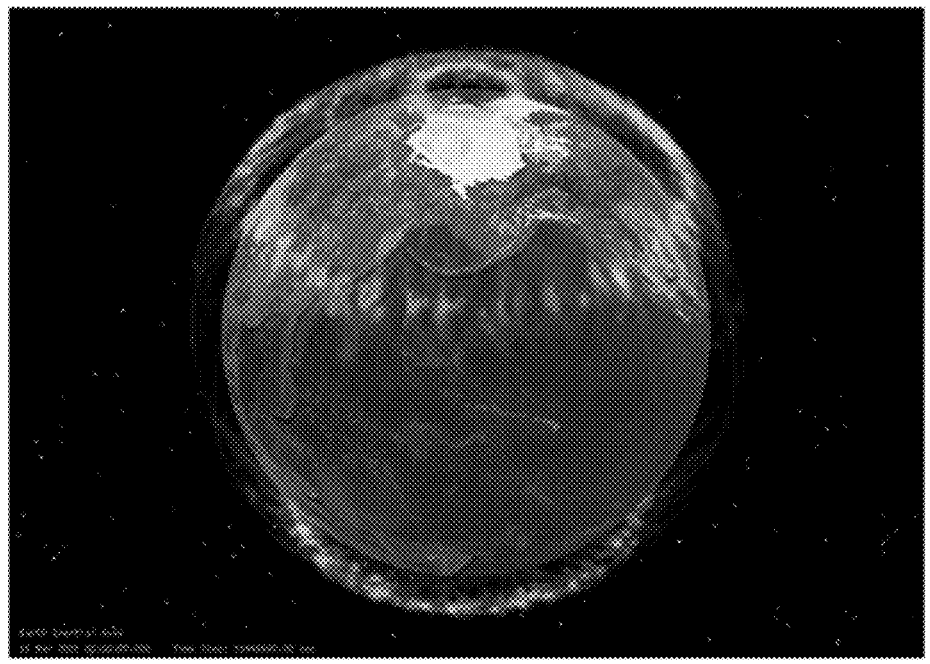
FIGS. 8A-D illustrate Low Earth Orbit (LEO) spatial densities for select time periods.
Figure 8B:
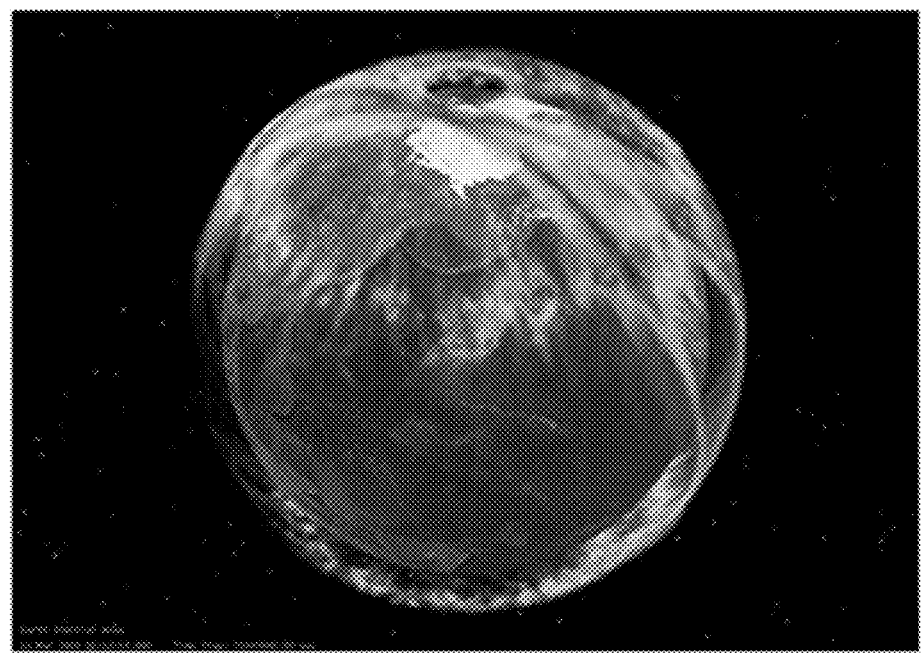
Figure 8C:
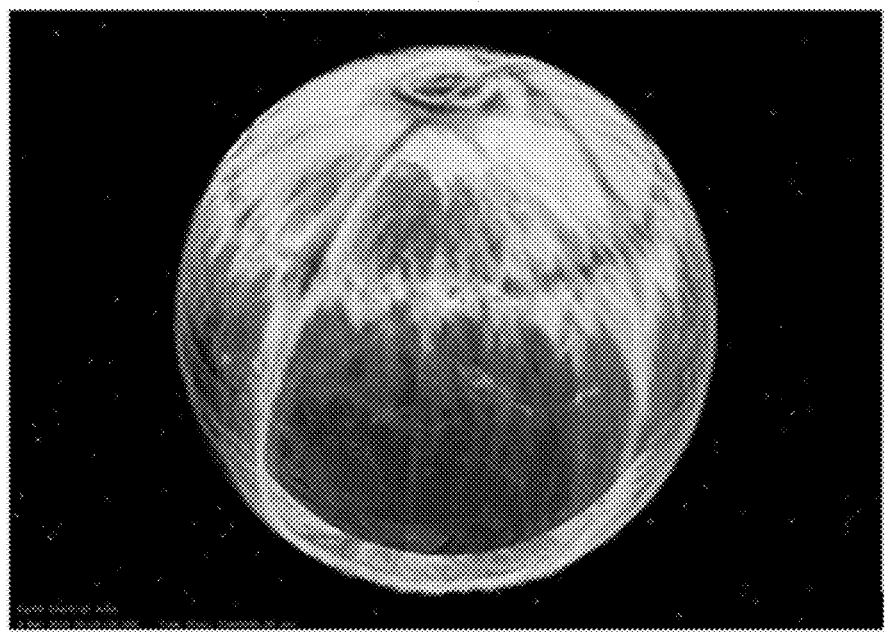
Figure 8D:
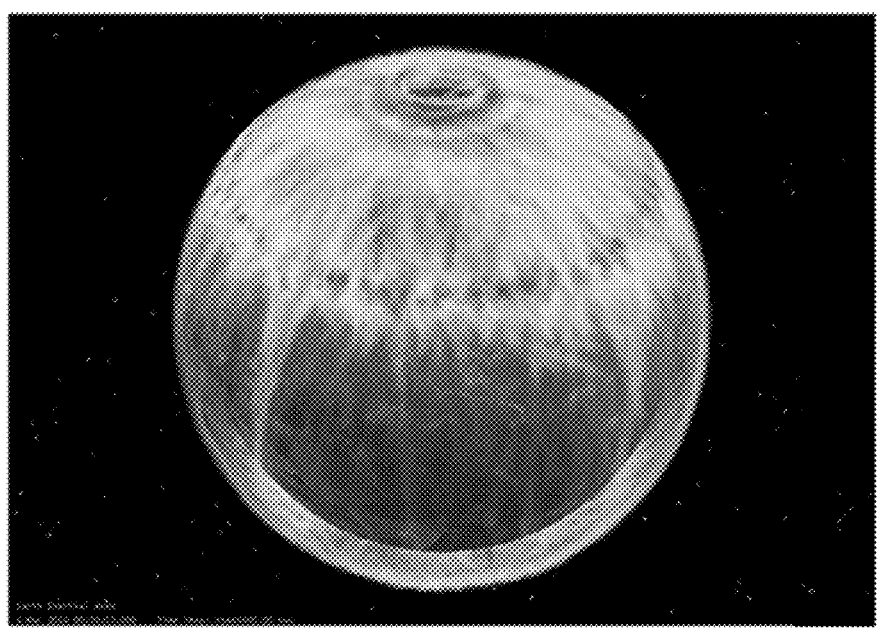

FIG. 6 has an x-axis with mean argument of latitude in degrees and a y-axis for radian and cross track (osculating–mean) separations in kilometers. In the "worst-case" example, cross-track variations 601 may be seen to be less than 50 meters, while radial cross track variations 603 may be as high as 3.3 km. For more typical orbits and user-specified encounter sphere radii as low as 20 meters, this illustrates that short-period variations in the cross-track direction may safely be neglected, whereas it could be very important to incorporate the radial variation.

Comparing the above analytical expression for $\Delta r_Q$ and with a numerically-integrated version (with only $J_2$ modeled), the two lines illustrating radial track variations 603a and 603b show excellent agreement and demonstrate that this $\Delta r_Q$ equation is well-suited for a volumetric encounter probability method.

The embodiments as presented above were originally designed for idealized orbit ellipses that close upon themselves. However, a host of perturbing forces (e.g. oblate central body, drag, SRP, $3^{rd}$-body gravity) make such idealized orbits unrealistic. Fortunately, this method easily extends to account for such perturbing forces.

The method may account for such time-varying evolutions of the mean orbit elements by applying the encounter probability method 700, illustrated in FIG. 7, to each successive planar crossing in serial fashion. Method 700 may be performed by a processor of a computing device, such as computing device 180. In block 701, the processor may establish a planar crossing or a likelihood of a planar crossing. In block 703, the processor may estimate the next planar crossing site based upon current mean orbit elements and relative planar geometry. In block 705, the processor may evaluate the mean orbit elements rates-of-change extant at each planar crossing site. In block 707, the processor may accumulate the orbit element changes to the time of the next estimated encounter. In block 709, the processor may estimate the encounter probability for the next planar crossing site and log the results for aggregation, statistics accumulation and/or event mapping. In determination block 711, the processor may determine whether another time varying evolution to the mean orbit elements is desired, (e.g. determination block 711="Yes") return to block 703, if not, (e.g., determination block 713="No") go to block 713 and the cycle may be terminated.

The method 700 may be returned to at any time when additional or changes perturbing forces may need to be accounted for or are discovered or an additional crossing is to be calculated. This may be continued at block 703 based upon the latest calculations available when ending in block 713, otherwise the next iteration may be started at block 701. The application of the method illustrated in FIG. 7 allows the user to select a secular-rates model of appropriate fidelity to portray orbital motion accurately throughout the time span of interest.

Equations (4) and (5), instantaneous encounter probability values may be mapped into estimated encounter probabilities over a period of time such as a day. In an embodiment illustrating a period of one year, with N conjunctions, the $P_{Encounter}$ per second is:

$$P_{Encounter} = \frac{\sum_N \text{Conjuction\_Dura}}{365 + 86400} \quad (36)$$

As stated above, for every incremental $M_2$ where contact is possible there is a corresponding range of $M_1$ in which an encounter could occur. By reintroducing the sixth element (along-track position), this volumetric method may be used to identify upcoming encounters. In one embodiment, to determine the number of encounters $N_{Encounters}$ over a specified length of time, a table of corresponding occurrences may be established to determine any such encounters. The data for such a table may be provided by the values of $x_2$ and $y_2$ and equation (29) for each instance of $M_2$ that satisfies the inclusivity test for the method described herein.

With this table it is possible to move $M_1$ and $M_2$ forward in time and repeatedly make comparisons. If the value of the current $M_2$ allows contact and the corresponding value of $M_1$ is within the proper range then an encounter has occurred. The counter may be incremented and the time advanced to the beginning of the next possible nodal encounter region. If the value of $M_1$ is not within the proper range then time may be incremented to advance to the next value of $M_2$ and the comparison process repeated.

Although useful for conceptualizing an approach to estimating the number of encounters over a period of interest, the lookup table mentioned above, and inter-satellite mean anomaly mapping tables, can successfully be eliminated by embedding the periodic checks for simultaneous occupancy of each discrete step inside of the instantaneous encounter probability discretization loop in the method herein presented. The method retains full fidelity of the resultant number of encounters.

An application of the encounter probability approach to long-term orbit evolution, the characterization of spatial density in three dimensions may be calculated and displayed. To perform the characterization, the Two Line Element (TLE) catalog files from CelesTrak were used corresponding to the month of March for 2005, 2008, 2010, and 2014. FIGS. 8A-D illustrate volumetric display capabilities. The spatial density time sequences clearly show the extensive growth in the space population over the past decade. The scale of values goes continuously from light gray to dark gray illustrating the highest values FIGS. 8A-D.

Figure 9A:
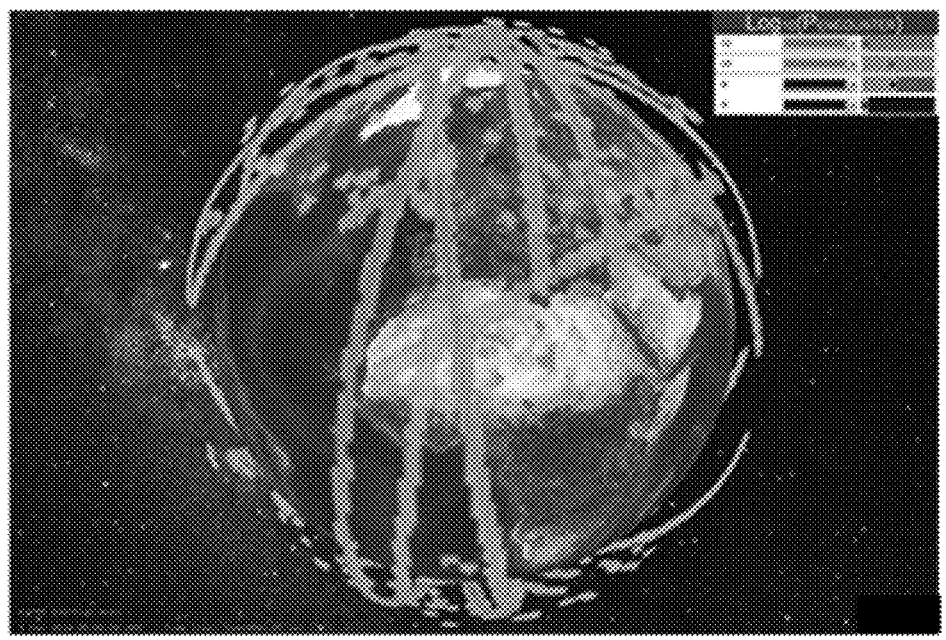
FIGS. 9A-B illustrate encounter probabilities with and without coplanar orbits according to an embodiment.

With spatial density calculated, the new encounter probability approach may be applied to a time span. One example time span as illustrated in FIG. 9A is a 100-year time span based upon the public TLE catalog dated 29 Jun. 2014. Probability of encounter to 1 km is computed as a demonstration with instantaneous encounter probability computed. Subsequent epochs may be computed by either selecting additional TLE catalog epochs (e.g. historical portrayal) or by applying secular rates to the orbit mean elements as described previously. Results are illustrated in FIG. 9A.

FIG. 9A illustrates that as coplanar orbits are properly analyzed under the volumetric encounter probability method's assumption of uniform distribution. For active satellites flying in formation, such coplanar satellites are not truly a threat to each other as long as they are properly disposed of at the end of their mission.

Figure 9B:
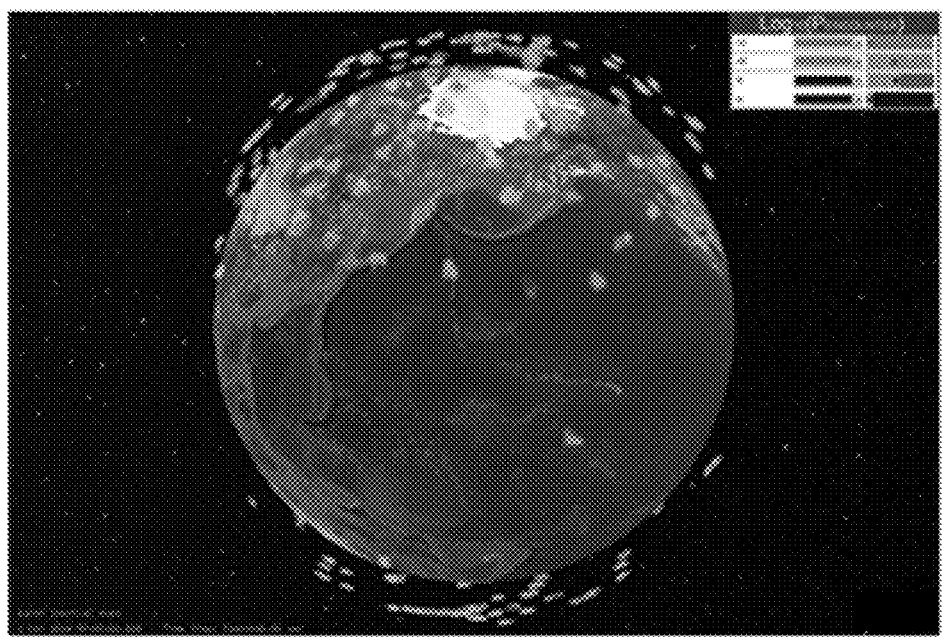

Using a simple angular momentum magnitude and alignment filter, the coplanar cases may be readily discarded as illustrated in FIG. 9B. Note that it is easy to see the correlation between the likely collision locations in FIG. 9B and the LEO high spatial density (dark grey) regions in FIG. 8D.

Encounters generally have some (however small) offset, or minimum range at TCA. But when characterizing the reduction in number of encounters for two different encounter radii $R_{E_{Big}}$ 115 and $R_{E_{Small}}$ 111 as illustrated in FIG. 1B, it is useful to identify those cases by whether a first satellite's path 103 is either (a) outside of a second satellite's path-centered torus 109 of radius $R_{E_{Small}}$ 111, or (b) inside of a second satellite's path-centered torus 113 for both radii $R_{E_{Small}}$ 111 and $R_{E_{Big}}$ 115. As illustrated in FIG. 1B, an "offset encounter" is when the trajectories of the two spacecraft are offset such that at TCA the miss distance is outside smaller encounter radius $R_{E_{Small}}$ 111 but inside the larger encounter radius $R_{E_{Big}}$ 115, whereas in another embodiment, a "direct encounter," for which the volumetric encounter probability method which estimates a non-zero encounter probability even for encounter radius $R_{E_{Small}}$ 111.

It may be of interest to know how many fewer encounters may be experienced as a function of encounter radius, assuming that the distribution of the first satellite's positional path at TCA is uncorrelated to the positional path of the second satellite. The relationship between the two toroids is based on the lineal radius dimension. This may be seen by moving satellite path 103 up (away from) and down (toward) a second satellite's path in FIG. 1B; note that no additional encounters of radius $R_{E_{Big}}$ 115 are found, even though a greater toroidal cross-section arc length is spanned.

For example, to estimate the number of close approaches likely to be possible for an orbit pair where the satellites' combined positional error could be 2 km for tracking system #1 and 50 m for tracking system #2, then $$100\left[1 - \frac{R_{E_{Small}}}{R_{E_{Big}}}\right]\% = 100\left[1 - \frac{50 \text{ m}}{2 \text{ km}}\right]\% = 97.5\%$$

of the offset encounters found using the $R_{E_{Big}}=2$ km encounter screening threshold are discarded by instead being able to obtain (and screen with) an $R_{E_{Small}}=50$ m encounter radius For "direct encounter" cases, unlike the offset encounters were it is possible to discard cases for justifiably smaller encounter radius screening thresholds as illustrated in FIG. 1B, other examples may have non-zero encounter probabilities.

In an example, two conjuncting circular orbits at 1200 km are chosen and choose a range of planar separation angles from 90° to 1° between the two orbit planes. For each planar separation angle, it may first be determined the average number of encounters that occur for a wide variety of encounter radii ranging from 100 km down to 1 m. Each specified encounter radius may use separate sample durations as noted above, and the sample durations for each encounter radius may be determined such that stability of the average number of encounters may be achieved. An empirical finding is that as long as encounter probability is non-zero, encounter probability may be directly proportional to the square of encounter radius. For example, a reduction by one order of magnitude in the encounter radius yields a reduction in encounter probability by two orders of magnitude.

Figure 11:
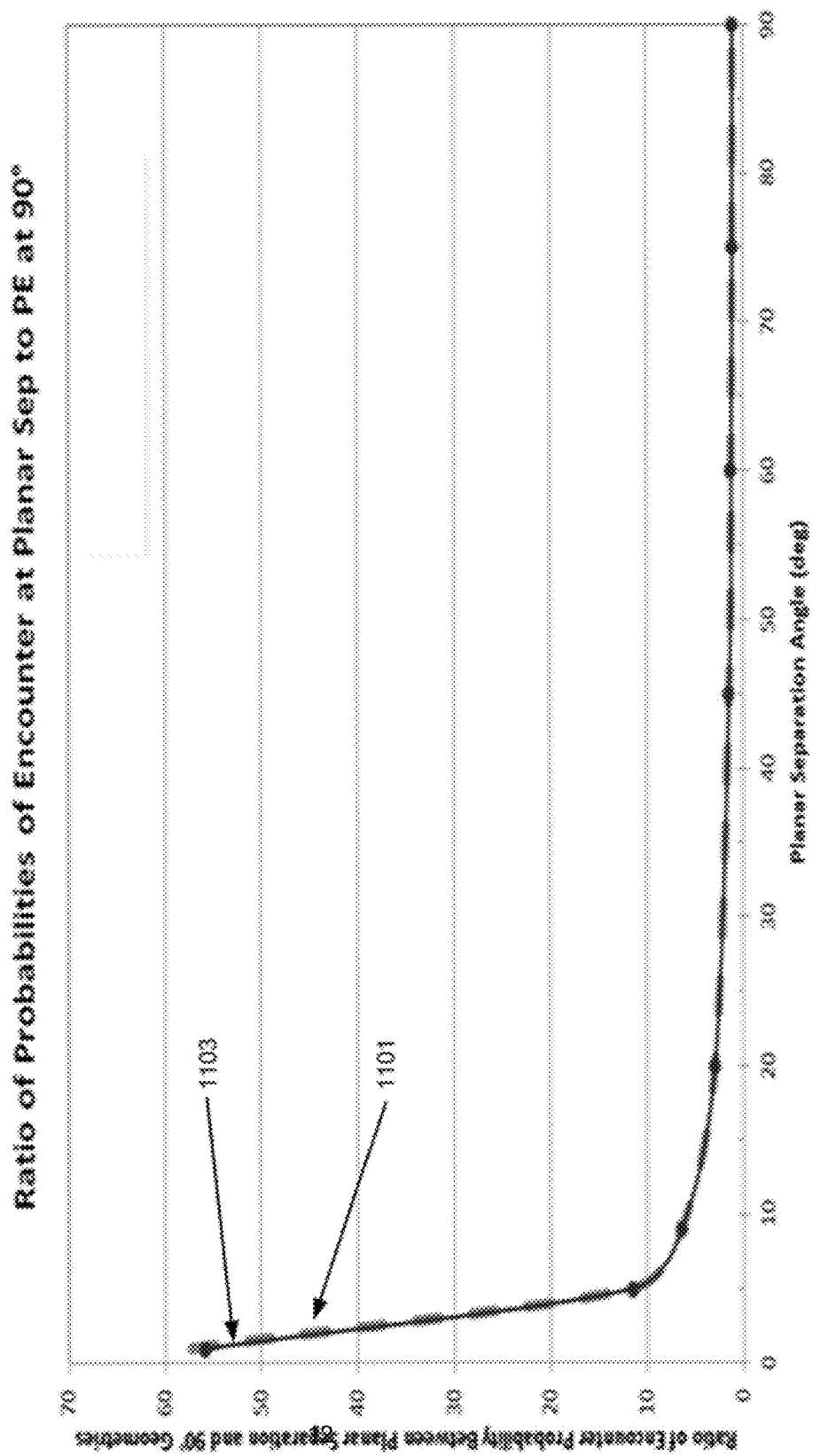
FIG. 11 is a graph of the Ratio of $P_{Encounter}$ at Planar Separation Angles between 0° and 90° to $P_{Encounter}$ at 90°.

In embodiments holding the two orbits of the conjuncting pair fixed and for a fixed encounter radius, the relationship between the number of encounters and the planar separation between the two orbits may be illustrated in FIG. 10. FIG. 10 illustrates the situation where orbit planes separated by 90° experience a slightly higher number of encounters than those at glancing angles, until those risks are all outweighed by coplanar and near-coplanar orbit pairing cases. The x-axis has a scale for the Planar Separation Angle (in degrees) and the y-axis has a scale for Ratio of Average Number of Encounters Between Planar Separation and 90° Geometries The log-linear relationships of both encounter probability and the number of encounters as a function of encounter radius demonstrates that it is possible to empirically derive a functional relationship between encounter probability and average annual number of encounters. It may also be observed that encounter probability varies much more than the average annual number of encounters, especially at small planar separation angles. As shown in FIG. 11, this profile may be independent of encounter radius and may be directly proportional to the cosecant of the planar separation angle. The x-axis is Planar Separation Angle in degrees and the y-axis is Patio of Encounter Probability Between Planar Separation and 90° Geometries. Dashed line 1101 is the line created by the equation $$\frac{1}{\sin(\text{Planar Separation Angle})},$$

or equivalently, csc(Planar Separation Angle). Line 1103 is ratio of $P_{Encounter}$ (Planar Separation Angle) to $P_{Encounter}$ (90°).

This may be achieved by the simple relationship provided in equation (37) (shown below). The approach may be to compute the average annual number of encounters for a relatively large encounter radius (e.g. 100 km) and then use equation (37) to scale that result down (or up) to the desired encounter radius.

$$N_{ENC}/\text{year}\{\text{Desired Enc Radius}\} = N_{Direct\_ENC}/\text{year} \quad (37)$$

$$\{\text{Enc Radius} = 100 \text{ km}\}\sqrt{\frac{\text{Probability}_{ENC\_Desired\_Enc\_Radius}}{\text{Probability}_{ENC\_100\_km}}}$$

Propagation Timespan (yrs) = $\quad (38)$ $$\text{Prop}_{Timespan}(100 \text{ km})\frac{100}{N_{ENC} \text{ per timespan }\{\text{Enc Radius} = 100 \text{ km}\}}$$

$$\sqrt{\frac{\text{Probability}_{ENC\_100\_km}}{\text{Probability}_{ENC\_Desired\_Enc\_Radius}}}$$

Equation (37) matches, to within a few percent, to the annual occurrence of encounter obtained from a full-up parametric evaluation. The relationship works well for all approach geometries, such an in an embodiment of a single pairing of conjuncting 1200 km circular orbits having planar separation of between greater than 0° up to 90°.

The total number of encounters experienced by an operator summed over all orbit pairings may be strongly dependent upon the encounter radius used. Accounting for the effects for both offset and direct encounters, the full relationship between the number of encounters for $R_{E_{Small}}$ versus $R_{E_{Big}}$ may be captured in equation (39). Note that since encounter probability may be a function of the square of encounter radius and the number of direct encounters linearly varies as a function of encounter radius, equation (39) contains an embedded $$\left[\frac{R_{E_{Small}}}{R_{E_{Big}}}\right]^2$$

relationship.

$$N_{ENC}/\text{year}\{\text{Desired Enc Radius}\} = \quad (39)$$

$$\sqrt{\frac{\text{Probability}_{ENC\_Desired\_Enc\_Radius}}{\text{Probability}_{ENC\_100\_km}}}\left[\frac{R_{E_{Small}}}{R_{E_{Big}}}\right]$$

$$N_{Total\ ENC}/\text{year}\{\text{Enc Radius} = 100 \text{ km}\}$$

Figure 12:
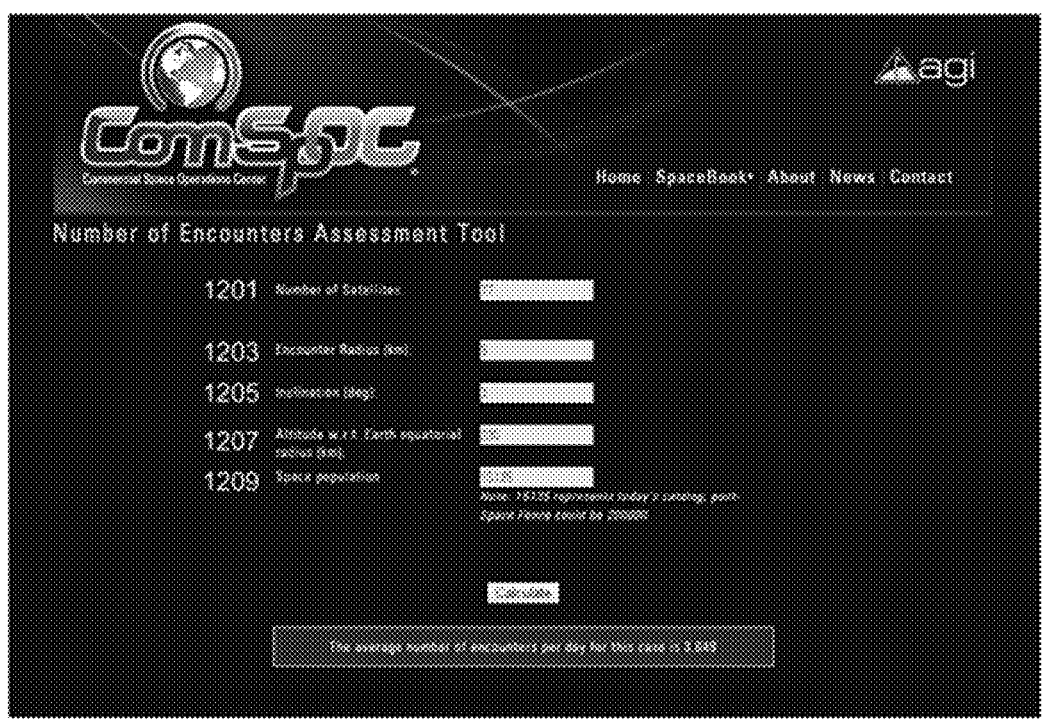
FIG. 12 illustrates an embodiment of an interface for calculating the average number of encounters per day.

FIG. 12 illustrates an embodiment of an interface for calculating the average number of encounters per day for a number of satellites 1201, each having an encounter radius in kilometers 1203, an orbital inclination in degrees 1205, an orbital altitude with respect to the Earth's equatorial radius in kilometers 1207, and a population of objects cataloged in space 1209. FIG. 12 illustrates the input of these parameters for an embodiment that results in an average of 3.649 encounters a day for the orbit.

Figure 13:
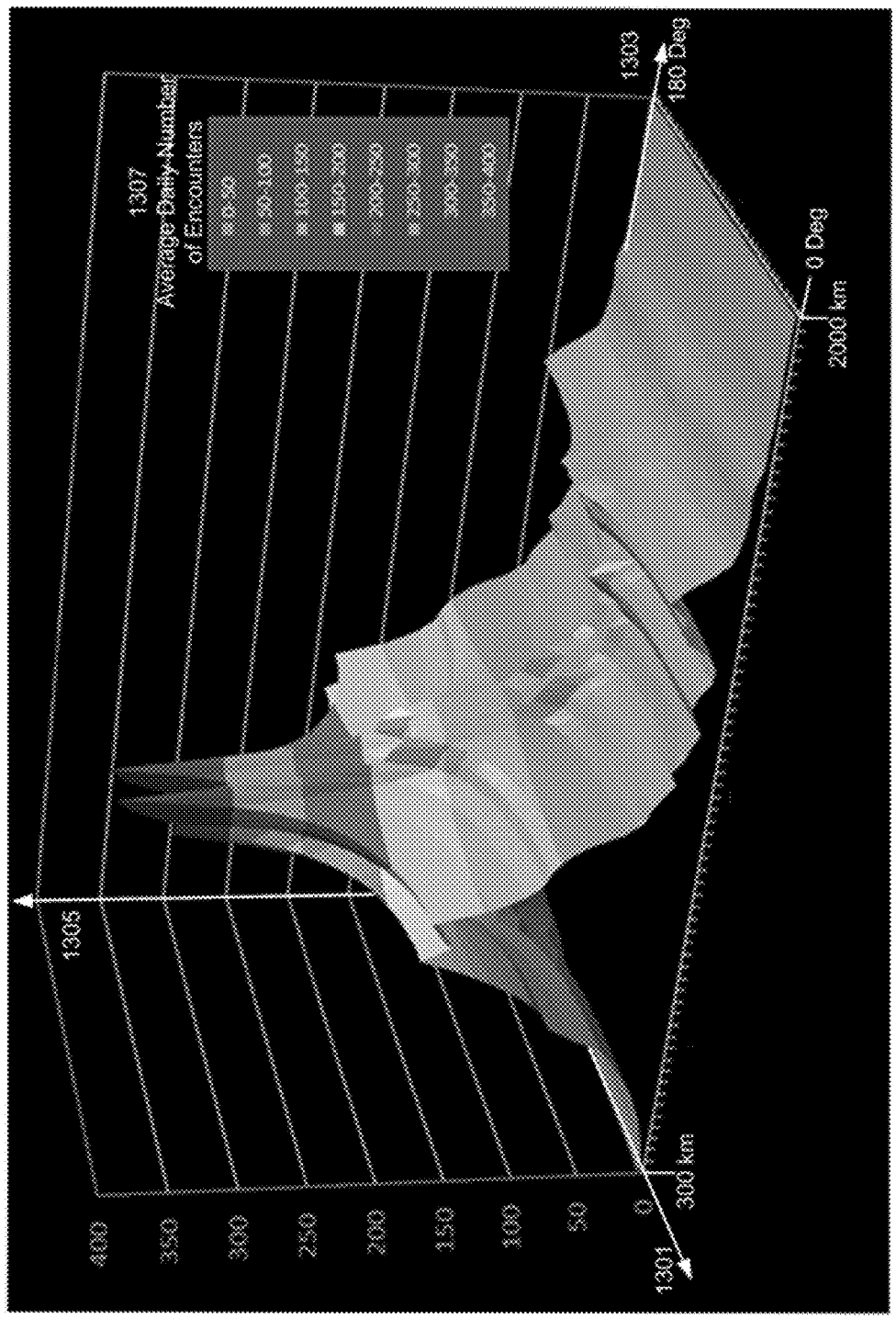
FIG. 13 illustrates an embodiment of a graphical representation of a calculation the average daily number of encounters for 2,000 spacecraft with encounter radii less than 1,000 meters versus altitude above the surface of the earth and orbital inclination.

FIG. 13 illustrates an embodiment of a graphical representation of a calculation the average daily number of encounters for 2,000 spacecraft with encounter radii less than 1,000 meters versus altitude above the surface of the earth and orbital inclination. FIG. 13 has an x-axis 1301 for an orbital inclination measured in degrees with a scale from 180 to 0 degrees, and a circular orbit with an altitude denoted by the y-axis 1303 above a spherical Earth measured in kilometers with a scale from 300 to 2,000 kilometers, both against a z-axis 1305 for the average daily number of encounters with an encounter distance less than 1,000 meters, with a scale going from 0 to 400 as for 2,000 spacecraft as measured against the entire Public TLE RSO Catalog published as of Mar. 13, 2015. The number of items in the catalog may be increased as desired or as items are added into the catalog. The number may also be decreased if necessary or desired. The illustration also includes a key for the Average Daily Number of Encounters 1307.

FIG. 14 illustrates an embodiment method 1400 for determining an encounter probability. The operations of method 1400 may be performed by a processor of a computing device, such as computing device 180. In block 1401, the processor may receive initial orbital elements of a first satellite; including orbit semi-major axis, eccentricity, inclination, ascending node, argument of perigee, and mean anomaly. In block 1403, the processor may calculate a first satellite's orbit according to the initial orbital elements of the first satellite. In block 1405, the processor may receive the characteristics of a volumetric shape that encloses the first satellite. As examples, the characteristics of the volumetric shape may define a sphere, ellipsoid, cube, or any other type shape. In block 1407, the processor may rotate the volumetric shape along the first satellite's orbit to create a toroid. In block 1409, the processor may receive orbital elements for a second satellite. In block 1411, the processor may calculate a second satellite's orbit according to the orbital elements of the second satellite. The orbital elements may include the second satellite's orbit semi-major axis, eccentricity, inclination, ascending node, argument of perigee, and mean anomaly. In determination block 1413, the processor may determine how many times a second satellite's orbit penetrates the toroid, where each penetration comprising a nodal crossing. If there are no nodal crossings, (i.e., determination block 1413="nodal crossing=0"), in determination block 1423 the processor may determine if an encounter probability is desired for another satellite, object or orbit.

If determination block 1413 results in a number of nodal crossings greater than zero (i.e., determination block 1413="nodal crossing>0"), in block 1415 the length of each nodal crossing may be determined by the processor. In block 1417 the processor may calculate an instantaneous encounter probability value based on the total length of the nodal crossings for a single revolution about the orbit of the second satellite. Proceeding to decision block 1423, the processor may determine if an encounter probability is desired for another satellite or object.

In an alternative embodiment, when determination block 1413 results in a number of nodal crossings greater than zero (e.g., determination block 1413="nodal crossing>0"), in block 1419, for each nodal crossing, the processor may calculate an encounter region in mean anomaly space, where an encounter is each time the second satellite's orbit crosses through the encounter region. In block 1421, the processor may increment the orbit of the satellite in mean anomaly space for a period of time to determine the number of encounters in a time period.

In determination block 1423, the processor may determine if an encounter probability is desired for another satellite, object or orbit. If no more calculations are desired, (e.g., determination block 1423="no"), in block 1425 the method 1400 may end. If more calculations are desired for the first satellite with the same toroidal shape, (e.g., determination block 1423="yes"), the processor may proceed to block 1409.

Figure 15:
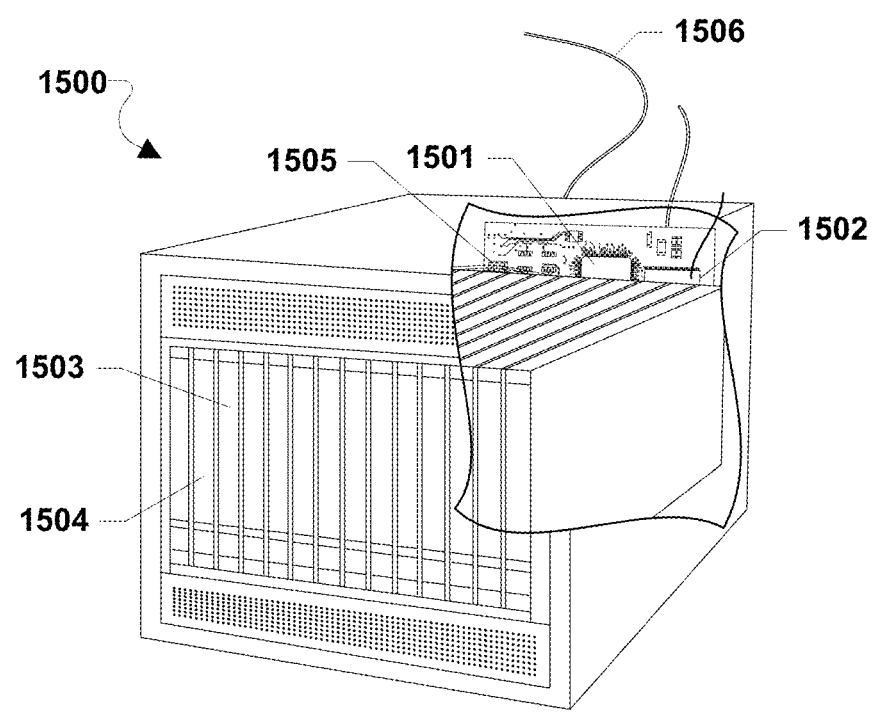
FIG. 15 is a component block diagram of a server suitable for use in the various embodiments.

The various embodiment methods may also be performed partially or completely on a server. Such embodiments may be implemented on any of a variety of commercially available server devices, such as the server 1500 illustrated in FIG. 15. Such a server 1500 typically includes a processor 1501 coupled to volatile memory 1502 and a large capacity nonvolatile memory, such as a disk drive 1503. The server 1500 may also include a floppy disc drive, compact disc (CD) or DVD disc drive 1504 coupled to the processor 1501. The server 1500 may also include network access ports 1505 coupled to the processor 1501 for establishing data connections with a network 1506, such as a local area network coupled to other broadcast system computers and servers. The processor 1501 may be any programmable microprocessor, microcomputer or multiple processor chip or chips that may be configured by software instructions (applications) to perform a variety of functions, including the functions of the various embodiments described above. Typically, software applications may be stored in the internal memory 1502, 1503 before they are accessed and loaded into the processor 1501. The processor 1501 may include internal memory sufficient to store the application software instructions.

Figure 16:
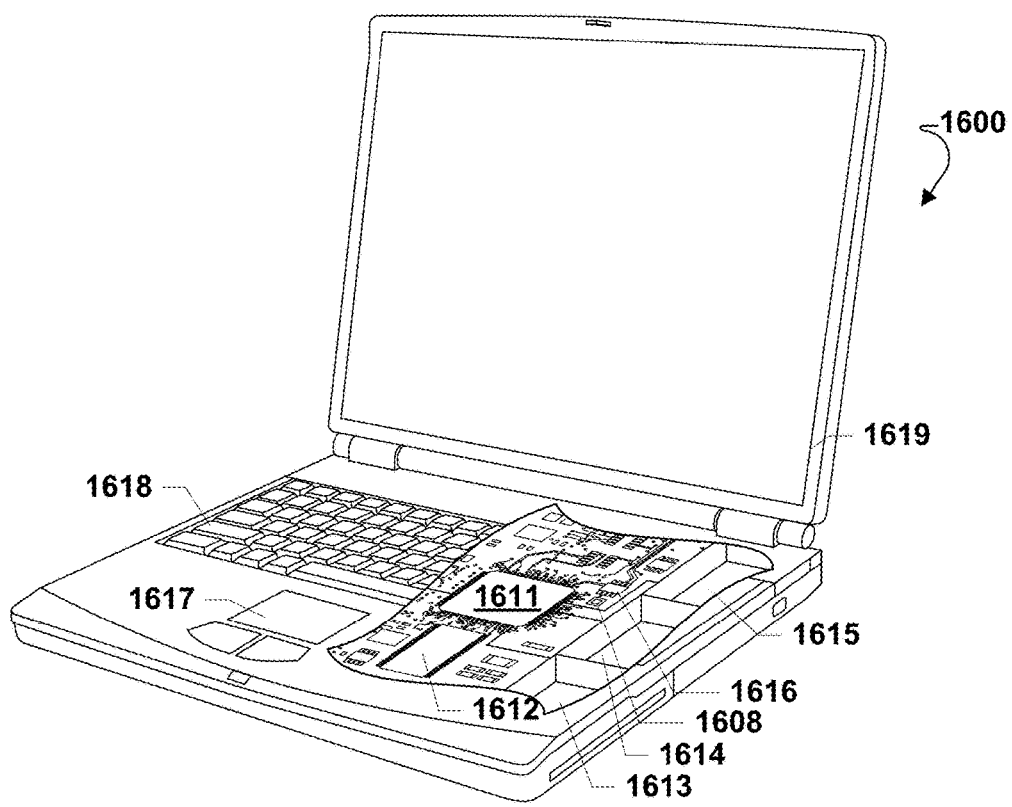
FIG. 16 is a component block diagram of a laptop that is a computing device suitable for use in the various embodiments.

The various embodiments described above may also be implemented within a variety of computing devices, such as a laptop computer 1600 illustrated in FIG. 16. Many laptop computers include a touchpad touch surface 1617 that serves as the computer's pointing device, and thus may receive drag, scroll, and flick gestures similar to those implemented on mobile computing devices equipped with a touch screen display and described above. A laptop computer 1600 will typically include a processor 1611 coupled to volatile memory 1612 and a large capacity nonvolatile memory, such as a disk drive 1613 of Flash memory. Additionally, the computer 1600 may have one or more antennas 1608 for sending and receiving electromagnetic radiation that may be connected to a wireless data link and/or cellular telephone transceiver 1616 coupled to the processor 1611. The computer 1600 may also include a floppy disc drive 1614 and a compact disc (CD) drive 1615 coupled to the processor 1611. In a notebook configuration, the computer housing includes the touchpad 1617, the keyboard 1618, and the display 1619 all coupled to the processor 1611. Other configurations of the mobile computing device may include a computer mouse or trackball coupled to the processor (e.g., via a USB input) as are well known, which may also be used in conjunction with the various embodiments.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for determining an encounter probability between satellites, comprising:
    receiving initial orbital elements of a first satellite, the initial orbital elements of the first satellite comprising an orbit semi-major axis, an eccentricity, an inclination, an ascending node, an argument of perigee, and a mean anomaly;
    calculating a first satellite's orbit according to the initial orbital elements of the first satellite;
    receiving orbital elements of a second satellite;
    calculating an orbit of a second satellite according to orbital elements of the second satellite;
    receiving characteristics of a volumetric shape that encloses the second satellite;
    rotating the volumetric shape along the second satellite's orbit to create a toroid;
    determining each penetration of the toroid by the first satellite's orbit, wherein each penetration comprises a nodal crossing;
    determining a length of each nodal crossing;
    calculating an instantaneous encounter probability value based on a total length of the nodal crossings for a single revolution about the orbit of the second satellite; and
    using the instantaneous encounter probability value to adjust the first satellite's orbit.

2. The method of claim 1, wherein the initial orbital elements of the first satellite create a closed orbital path.

3. The method of claim 1, wherein the mean anomaly is a true anomaly for the first satellite.

4. The method of claim 1, wherein the mean anomaly is chosen from a range to force an initial encounter.

5. The method of claim 1, wherein the initial orbital elements of the first satellite further comprise J2 terms, oblate central body effects, drag, solar radiation pressure (SRP), and 3rd-body gravity influences.

6. The method of claim 1, wherein the volumetric shape comprises an irregular enclosed volume.

7. The method of claim 1, wherein the volumetric shape further comprises a geometric volume.

8. The method of claim 7, wherein the volumetric shape is an ellipsoid.

9. The method of claim 7, wherein the volumetric shape is a sphere.

10. The method of claim 1, further comprising:
determining by an apogee-perigee filter whether the first satellite's orbit comes within a range of the second satellite's orbit before determining each penetration of the toroid by the first satellite's orbit; and
determining each penetration of the toroid by the first satellite's orbit in response to determining by the apogee-perigee filter that the first satellite's orbit comes within the range of the first satellite's orbit.

11. A computing device, comprising:
a processor, wherein the processor is configured with processor-executable instructions to perform operations comprising:
receiving initial orbital elements of a first satellite, the initial orbital elements of the first satellite comprising an orbit semi-major axis, an eccentricity, an inclination, an ascending node, an argument of perigee, and a mean anomaly;
calculating a first satellite's orbit according to the initial orbital elements of the first satellite;
receiving orbital elements of a second satellite;
calculating an orbit of a second satellite according to orbital elements of the second satellite;
receiving characteristics of a volumetric shape that encloses the second satellite;
rotating the volumetric shape along the second satellite's orbit to create a toroid;
determining each penetration of the toroid by the first satellite's orbit, wherein each penetration comprises a nodal crossing;
determining a length of each nodal crossing;
calculating an instantaneous encounter probability value based on a total length of the nodal crossings for a single revolution about the second satellite's orbit; and
using the instantaneous encounter probability value to adjust the first satellite's orbit.

12. The computing device of claim 11, wherein the initial orbital elements of the first satellite create a closed orbital path.

13. The computing device of claim 11, wherein the mean anomaly is a true anomaly for the first satellite.

14. The computing device of claim 11, wherein the mean anomaly is chosen from a range to force an initial encounter.

15. The computing device of claim 11, wherein the initial orbital elements of the first satellite further comprise J2 terms, oblate central body effects, drag, solar radiation pressure (SRP), and 3rd-body gravity influences.

16. The computing device of claim 11, wherein the volumetric shape comprises an irregular enclosed volume.

17. The computing device of claim 11, wherein the volumetric shape further comprises a geometric volume.

18. The computing device of claim 17, wherein the volumetric shape is an ellipsoid.

19. The computing device of claim 17, wherein the volumetric shape is a sphere.

20. The computing device of claim 11, wherein the processor is configured with processor-executable instructions to perform operations further comprising:
determining by an apogee-perigee filter whether the first satellite's orbit comes within a range of the second satellite's orbit before determining each penetration of the toroid by the first satellite's orbit; and
determining each penetration of the toroid by the first satellite's orbit in response to determining by the apogee-perigee filter that the first satellite's orbit comes within the range of the second satellite's orbit.

* * * * *